United States Patent
Xu et al.

(10) Patent No.: US 12,095,941 B2
(45) Date of Patent: Sep. 17, 2024

(54) MESSAGE NOTIFICATION METHOD AND ELECTRONIC DEVICE

(71) Applicant: HUAWEI TECHNOLOGIES CO., LTD., Shenzhen (CN)

(72) Inventors: Shikun Xu, Shenzhen (CN); Lanhao Chen, Shenzhen (CN); Fei Yu, Shenzhen (CN); Zhongling Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 22 days.

(21) Appl. No.: 17/674,992

(22) Filed: Feb. 18, 2022

(65) Prior Publication Data
US 2022/0174143 A1   Jun. 2, 2022

Related U.S. Application Data

(63) Continuation of application No. PCT/CN2020/108521, filed on Aug. 11, 2020.

(30) Foreign Application Priority Data

Aug. 28, 2019   (CN) .................. 201910803977.X

(51) Int. Cl.
    H04M 1/7243     (2021.01)
    H04M 1/72484    (2021.01)
(52) U.S. Cl.
    CPC ..... *H04M 1/7243* (2021.01); *H04M 1/72484* (2021.01)

(58) Field of Classification Search
CPC .......... H04B 7/18502; H04B 7/18519; H04W 36/0058; H04W 36/0072; H04W 36/18; H04W 36/32; H04W 56/0065
See application file for complete search history.

(56) References Cited

U.S. PATENT DOCUMENTS

| 10,809,671 B2 * | 10/2020 | Chi ..................... G04G 9/0064 |
| 2015/0229774 A1 | 8/2015 | Mason et al. |

(Continued)

FOREIGN PATENT DOCUMENTS

| CN | 103338282 A | 10/2013 |
| CN | 104598186 A | 5/2015 |

(Continued)

*Primary Examiner* — Lester G Kincaid
*Assistant Examiner* — Dung L Lam
(74) *Attorney, Agent, or Firm* — Rimon PC

(57) ABSTRACT

A message notification method and an electronic device are provided. When a primary screen is turned off, prompt information of a notification message is displayed on a secondary screen located right above a front-facing camera, so that a user can notice a message notification in time, and user experience is improved. A specific solution is as follows: After the primary screen is turned off, if the electronic device detects a first notification message, the electronic device displays first information on the secondary screen. The first information is used to prompt the user that the first notification message has been received. The electronic device detects a first operation in which the user indicates to turn on the primary screen. The electronic device turns on the primary screen in response to the first operation. The electronic device displays second information on the secondary screen.

15 Claims, 16 Drawing Sheets

(56) References Cited

U.S. PATENT DOCUMENTS

| | | | | |
|---|---|---|---|---|
| 2017/0010771 | A1* | 1/2017 | Bernstein | G09G 5/12 |
| 2018/0017996 | A1* | 1/2018 | Ryu | G06F 1/1643 |
| 2018/0032203 | A1* | 2/2018 | Sepulveda | G06F 3/0482 |
| 2018/0307356 | A1* | 10/2018 | Zhu | G06F 3/0483 |

FOREIGN PATENT DOCUMENTS

| | | |
|---|---|---|
| CN | 104796553 A | 7/2015 |
| CN | 106453883 A | 2/2017 |
| CN | 106681613 A | 5/2017 |
| CN | 106920470 A | 7/2017 |
| CN | 108512991 A | 9/2018 |
| CN | 109040364 A | 12/2018 |
| CN | 110727380 A | 1/2020 |
| EP | 3396520 A1 | 10/2018 |
| WO | 2012169941 A2 | 12/2012 |

* cited by examiner

MESSAGE NOTIFICATION METHOD AND ELECTRONIC DEVICE

CROSS-REFERENCE TO RELATED APPLICATIONS

This application is a continuation of International Application No. PCT/CN2020/108521, filed on Aug. 11, 2020, which claims priority to Chinese Patent Application No. 201910803977.X, filed on Aug. 28, 2019. The disclosures of the aforementioned applications are hereby incorporated by reference in their entireties.

TECHNICAL FIELD

Embodiments of this application relate to the field of electronic technologies, and in particular, to a message notification method and an electronic device.

BACKGROUND

With the development of electronic technologies, a larger screen-to-body ratio has become a development trend of electronic devices such as mobile phones. For example, major vendors have made a plurality of types of expansion designs such as a notched screen and a dewdrop screen to save space, so as to minimize space occupied by various components in the mobile phone on a screen of the mobile phone.

For example, to reduce space occupied by an indicator on the screen, for some mobile phones, the indicator is placed on the top or on a side, for example, the indicator is placed on a pop-up camera on the top. In this design, the indicator does not occupy additional screen space. However, when the mobile phone is placed horizontally or in another normal placement manner, a message notification of the indicator is difficult to be noticed by a user when the screen is turned off. Consequently, user experience is relatively poor.

SUMMARY

Embodiments of this application provide a message notification method and an electronic device. When a primary screen is turned off, prompt information of a notification message is displayed on a secondary screen located right above a front-facing camera, so that a user can notice a message notification in time, improving user experience.

To achieve the foregoing objective, the following technical solutions are used in the embodiments of this application.

According to one aspect, a technical solution of this application provides a message notification method, applied to an electronic device having a screen and a camera below the screen. The screen includes a primary screen and a secondary screen, and the secondary screen is located right above the camera. The method may include: After the primary screen is turned off, if the electronic device detects a first notification message, the electronic device displays first information on the secondary screen. The first information is used to prompt a user that the first notification message has been received. The electronic device detects a first operation in which the user indicates to turn on the primary screen. The electronic device turns on the primary screen in response to the first operation. The electronic device displays second information on the secondary screen.

The camera below the screen may be a front-facing camera.

In this solution, the electronic device prompts a notification message to the user by using the secondary screen when the primary screen is turned off. Compared with the solution in the conventional technology that an indicator is disposed on the top or a side of the electronic device, and consequently a notification message prompt on the secondary screen is difficult to be noticed by the user, in the solution of this application, a notification message prompt on the secondary screen is easy to be noticed by the user in time, and user experience is improved. In addition, the secondary screen can be further used to display the second information when the primary screen is turned on. This can not only resolve a problem of discontinuity caused because a screen area of the secondary screen right above the camera cannot display when the screen is turned on because the camera disposed below the secondary screen destroys a display structure, but also provides an information display for the user. This not only improves the visual experience of the user, but also is novel and convenient to use.

In a possible implementation, that the electronic device displays first information on the secondary screen includes: The electronic device turns on the secondary screen to notify the user, or the electronic device intermittently turns on the secondary screen to notify the user, or the electronic device dynamically displays a first interface element on the secondary screen to notify the user. The electronic device displays the first information on the secondary screen after detecting an operation of picking up the electronic device by the user.

In this solution, the electronic device first prompts the user by turning on the secondary screen or dynamically displaying an interface element on the secondary screen, and then displays the first information on the secondary screen when the user picks up the mobile phone, so as to further prompt, by using the first information, the user with specific information corresponding to the first notification message.

In another possible implementation, that the electronic device displays first information on the secondary screen includes: The electronic device intermittently displays the first information on the secondary screen.

In this solution, the electronic device does not turn on the secondary screen or dynamically display the interface element on the secondary screen, but directly and intermittently displays the first information on the secondary screen to achieve a blinking notification effect of "displaying—turning off the screen—displaying". The blinking notification simulates a blinking effect of the indicator, and can well notify the user of the first notification message.

In another possible implementation, the first information includes an application icon and/or an application name corresponding to the first notification message.

To be specific, when both the primary screen and the secondary screen are turned off, if the electronic device detects the first notification message, the electronic device may display, on the secondary screen, the application icon and/or the application name corresponding to the first notification message, to prompt the user that the first notification message has been received.

In another possible implementation, that the electronic device displays second information on the secondary screen includes: If the primary screen displays a first interface, where the first interface includes the first notification message, or the first interface is an interface of an application corresponding to the first notification message, the electronic device displays a first status parameter of the electronic device on the secondary screen. If the primary screen displays an interface other than the first interface, the second information is the first information.

In this solution, when the primary screen is lit up, if the primary screen displays the first interface, the first interface includes the first notification message, or the first interface is the interface of the application corresponding to the first notification message. In this case, because the user has entered the first notification message or the interface corresponding to the first notification message, the user does not need to be prompted with the first notification message. The electronic device may display the first status parameter of the electronic device on the secondary screen, so as to prompt the user with status information about the electronic device. The electronic device displays the first status parameter on the secondary screen while displaying the first interface on the primary screen, so that the screen area right above the camera below the screen is not discontinuous when the primary screen is turned on, and a status parameter can be displayed by using the secondary screen disposed right above the camera. This provides a new and convenient experience for the user. In addition, if the primary screen displays the interface other than the first interface, it indicates that the user has not entered the first notification message or the interface corresponding to the first notification message. In this case, the second information is the first information, that is, the electronic device continues to display the first information on the secondary screen to indicate the user that the first notification message has been received, so as to prompt the user to view and process the first notification message.

In another possible implementation, the first status parameter of the electronic device includes at least one of the following sub-status parameters: a power status parameter, a memory status parameter, a network signal status parameter, or a network speed status parameter.

In other words, when the electronic device displays the first interface on the primary screen, displaying the first status parameter on the secondary screen may be displaying, on the secondary screen, the sub-status parameter including at least one of the power status parameter, the memory status parameter, the network signal status parameter, or the network speed status parameter.

In another possible implementation, the first status parameter includes a plurality of sub-status parameters, and that the electronic device displays a first status parameter of the electronic device on the secondary screen includes: The electronic device displays each of the plurality of sub-status parameters in turn on the secondary screen; or if the primary screen displays an interface corresponding to a first sub-status parameter, the electronic device displays, in turn, the other sub-status parameters in the plurality of sub-status parameters except for the first sub-status parameter on the secondary screen.

In other words, when the first status parameter includes the plurality of sub-status parameters, the electronic device displays each of the plurality of sub-status parameters in turn on the secondary screen. If the primary screen displays the interface corresponding to the first sub-status parameter, the first sub-status parameter does not need to be displayed on the secondary screen. Therefore, the electronic device may display the other sub-status parameters in the plurality of sub-status parameters except the first sub-status parameter in turn on the secondary screen.

In another possible implementation, after the electronic device displays the first status parameter of the electronic device on the secondary screen, the method further includes: The electronic device detects a second operation of modifying the first status parameter by the user on the primary screen. The electronic device displays a second status parameter obtained after modification on the secondary screen.

In other words, the user may set and modify the status parameter on the primary screen, and the secondary screen of the electronic device may display the status parameter according to the setting and modification of the user, so that display is more flexible and user experience is better.

In another possible implementation, after the electronic device displays the first status parameter of the electronic device on the secondary screen, the method further includes: If the electronic device detects a third operation of turning off the primary screen by the user or detects no user operation within a preset duration T1, the electronic device turns off the primary screen and the secondary screen.

In this solution, after the electronic device detects that the primary screen is turned on and the electronic device displays the first status parameter of the electronic device on the secondary screen, it indicates that the user has received a prompt of the first information displayed on the secondary screen, and the user may have viewed and processed the first notification message. After the user views and processes the first notification message, the user may turn off the primary screen by using the third operation, or enable the electronic device to turn off the primary screen when no user operation is detected within the preset duration T1. In this case, because the first notification message has been processed, the secondary screen is also turned off.

In another possible implementation, after the electronic device displays the second information on the secondary screen, the method further includes: If the electronic device detects that the camera has started, the electronic device stops displaying the second information on the secondary screen.

In other words, after the electronic device displays the second information on the secondary screen when the primary screen is turned on, the user may need to start the camera below the screen to photograph or record. In this case, the electronic device stops displaying the second information on the secondary screen, so that the lens is not blocked when the user uses the camera. This does not affect proper use of the camera by the user.

In another possible implementation, after the primary screen is turned off, the method further includes: If the electronic device is charging and the electronic device detects no notification message, the electronic device displays a charging parameter on the secondary screen.

In this solution, after the primary screen is turned off, if the electronic device is charging and the electronic device detects no notification message, the electronic device may display the charging parameter on the secondary screen, so as to notify the user of a charging status.

In another possible implementation, after the electronic device detects the first notification message, the method further includes: The electronic device detects a second notification message. The second notification message and the first notification message are from different applications. That the electronic device displays first information on the secondary screen includes: The electronic device displays the first information and third information on the secondary screen. The third information is used to prompt the user that the second notification message has been received.

In other words, if the electronic device detects the first notification message and the second notification message, and the second notification message and the first notification message are from different applications, the electronic device displays the first information and the third information on the secondary screen, so as to notify the user of both the first notification message and the second notification message.

In another possible implementation, that the electronic device displays the first information and third information on the secondary screen includes: The electronic device turns on the secondary screen to notify the user, or the electronic device intermittently turns on the secondary screen to notify the user, or the electronic device dynamically displays the first interface element on the secondary screen. The electronic device displays the first information and the third information on the secondary screen after the electronic device detects the operation of picking up the electronic device by the user.

In other words, the electronic device first prompts the user by turning on the secondary screen or dynamically displaying the interface element on the secondary screen, and then displays the first information and the third information on the secondary screen when the user picks up the mobile phone, so as to further prompt the user with specific information corresponding to the first notification message and the second notification message.

In another possible implementation, that the electronic device displays the first information and third information on the secondary screen includes: The electronic device alternately displays the first information and the third information on the secondary screen at an interval of a preset duration T2.

In other words, the electronic device does not turn on the secondary screen or dynamically display the interface element on the secondary screen, but directly and alternately displays the first information and the third information on the secondary screen at an interval of the preset duration T2. To be specific, the secondary screen is not lit up and the interface element is not dynamically displayed on the secondary screen. Instead, the preset duration T2 exists between displaying the first information and displaying the third information on the secondary screen, where T2 is a time interval, and the secondary screen may be turned off within T2. In this way, a blinking notification effect of "displaying the first information—turning off the screen—displaying the third information" is achieved. The blinking notification simulates the blinking effect of an indicator, and can well notify the user of the first notification message and the second notification message.

According to another aspect, this technical solution provides a message notification apparatus. The apparatus is included in an electronic device, and the apparatus has a function of implementing the behavior of the electronic device in the foregoing aspects and the possible implementations of the foregoing aspects. The function may be implemented by hardware, or may be implemented by hardware executing corresponding software. The hardware or the software includes one or more modules or units corresponding to the foregoing function, for example, a detection module or unit or a display module or unit.

According to another aspect, this technical solution provides an electronic device, including a screen, a camera below the screen, one or more processors, a memory, a plurality of applications, and one or more computer programs. The screen includes a primary screen and a secondary screen, the secondary screen is located right above the camera, the one or more computer programs are stored in the memory, and the one or more computer programs include instructions. When the instructions are executed by the electronic device, the electronic device is enabled to perform the message notification method in any possible implementation of any one of the foregoing aspects.

According to another aspect, this technical solution provides a computer storage medium, including computer instructions. When the computer instructions are run on an electronic device, the electronic device is enabled to perform the message notification method in any possible implementation of any one of the foregoing aspects.

According to another aspect, this technical solution provides a computer program product. When the computer program product runs on an electronic device, the electronic device is enabled to perform the message notification method in any possible design of any one of the foregoing aspects.

BRIEF DESCRIPTION OF DRAWINGS

FIG. 9(a)-1 and FIG. 9(a)-2 are a schematic diagram of a status parameter notification interface according to an embodiment of this application;

DESCRIPTION OF EMBODIMENTS

The following describes technical solutions in the embodiments of this application with reference to the accompanying drawings in the embodiments of this application. In the descriptions of the embodiments of this application, unless otherwise specified, "I" means "or". For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions of the embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the description of the embodiments, unless otherwise specified, "a plurality of" means two or more than two.

The embodiments of this application provide a message notification method and an electronic device, and the method may be applied to the electronic device. When a primary screen is turned off, the electronic device may display prompt information of a notification message by using a secondary screen right above a camera below a screen, so that a user can easily notice the prompt information. This brings a new notification message prompt experience to the user. Therefore, a notification effect for the user is improved, and user experience is improved. In addition, this avoids a problem as in the conventional technology that an indicator is disposed on the top or a side of a mobile phone, and consequently a message notification is not easily seen by the user when the message notification occurs, especially when the mobile phone is placed horizontally or in another normal placement manner, such that the notification effect is relatively poor.

The message notification method provided in the embodiments of this application may be applied to an electronic device, for example, a mobile phone, a tablet computer, a wearable device, a vehicle-mounted device, an augmented reality (AR) device/a virtual reality (VR) device, a notebook computer, an ultra-mobile personal computer (UMPC), a netbook, or a personal digital assistant (PDA). A specific type of the electronic device is not limited in the embodiments of this application.

Figure 1:
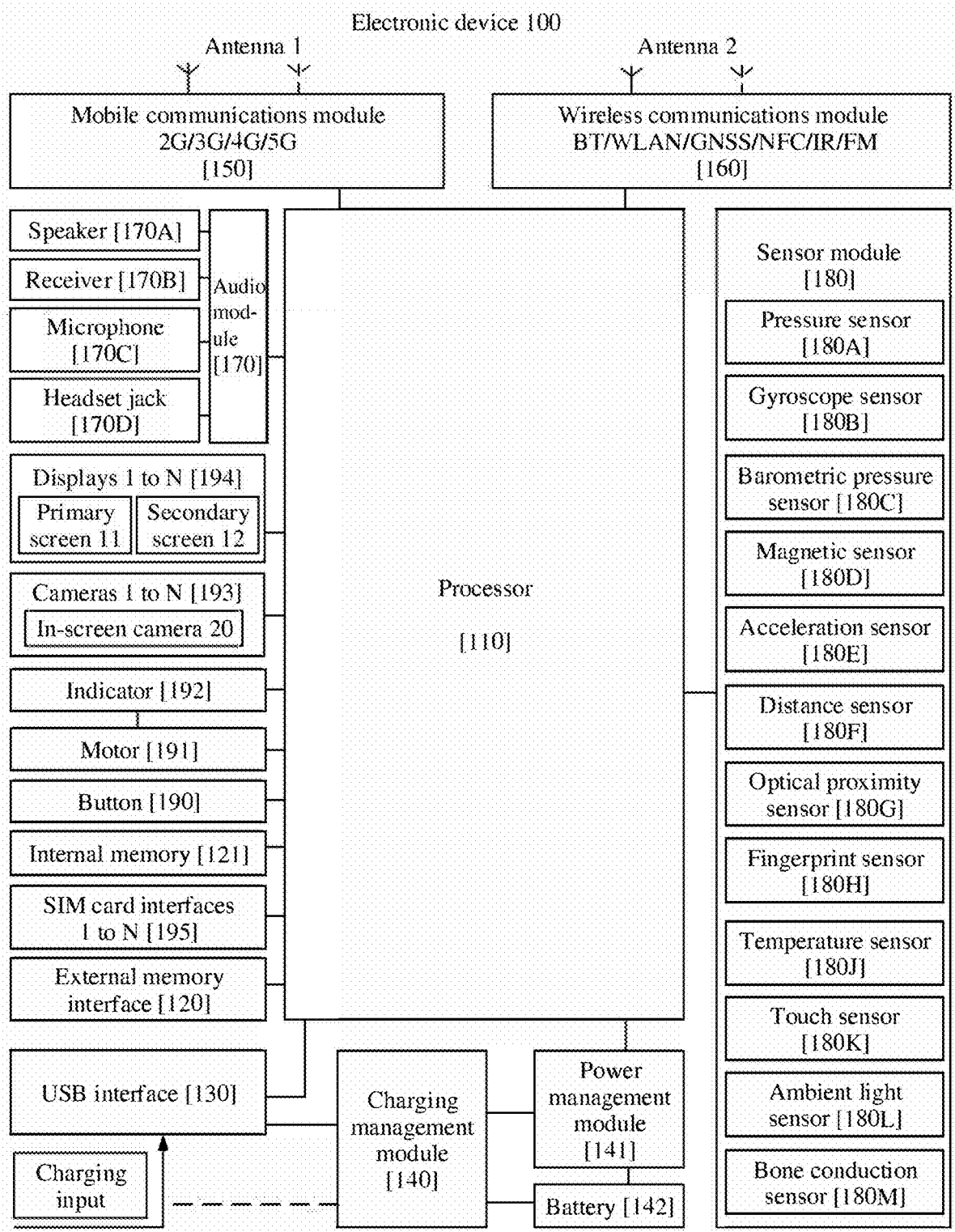
FIG. 1 is a schematic diagram of a hardware structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in the embodiments of this application does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, so that system efficiency is improved.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C interfaces. For example, the processor 110 may be coupled to the touch sensor 180K through the I2C interface, so that the processor 110 communicates with the touch sensor 180K through the I2C interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect to the processor 110 and the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect to the processor 110 and a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photography function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect to the processor 110, the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB Type C interface, or the like. The USB interface 130 may be configured to connect to a charger to charge the electronic device 100, or may be configured to transmit data between the electronic device 100 and a peripheral device, or may be configured to connect to a headset to play audio through the headset. Alternatively, the interface may be configured to connect to another electronic device, for example, an AR device.

It may be understood that an interface connection relationship between the modules illustrated in this embodiment of this application is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB interface 130. In some embodiments of wireless charging, the charging management module 140 may receive a wireless charging input by using a wireless charging coil of the electronic device 100. The charging management module 140 may further supply power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communications module 160, and the like. The power management unit 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communication frequency bands. Different antennas may further be multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a solution, applied to the electronic device 100, to wireless communication including 2G, 3G, 4G, 5G, or the like. The mobile communications module 150 may include at least one filter, a switch, a power amplifier, a low noise amplifier (LNA), and the like. The mobile communications module 150 may receive an electromagnetic wave through the antenna 1, perform processing such as filtering and amplification on the received electromagnetic wave, and transmit a processed electromagnetic wave to a modem processor for demodulation. The mobile communications module 150 may further amplify a signal modulated by the modem processor, and convert the signal into an electromagnetic wave through the antenna 1 for transmission. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communications module 150 or another function module.

The wireless communications module 160 may provide a solution, applied to the electronic device 100, to wireless communication including a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communications module 160 may be one or more components integrating at least one communications processor module. The wireless communications module 160 receives an electromagnetic wave by using an antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for transmission through the antenna 2.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 may implement a photography function through the ISP, the camera 193, the video codec, the GPU, the display 194, the application processor, and the like.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some embodiments, the electronic device 100 may include one or N cameras 193, where N is a positive integer greater than 1.

The camera 193 may include a front-facing camera, and may further include a rear-facing camera. In an electronic device that is set for a higher screen-to-body ratio, such as an electronic device having a bezel-less screen or a dewdrop screen, the front-facing camera may be disposed below the screen. The camera below the screen may also be referred to as an in-screen camera for short.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like.

In this embodiment of this application, the display 194 may include a primary screen 11 and a secondary screen 12. The primary screen 11 may be specifically one display screen, or may include a plurality of sub-display screens.

Figure 2A:
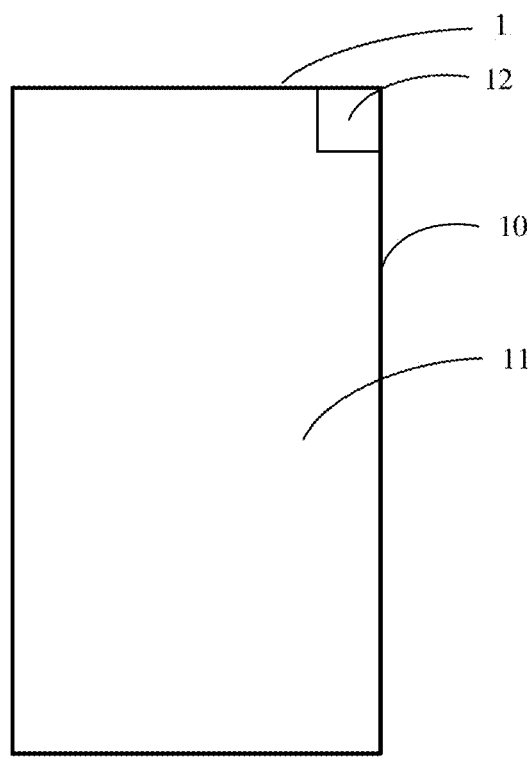
FIG. 2(a) is a schematic diagram of a screen of an electronic device according to an embodiment of this application.
Figure 2B:
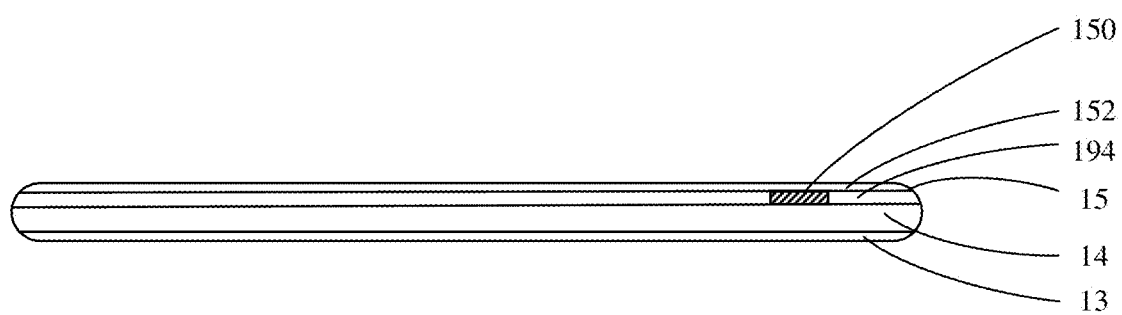
FIG. 2(b) is a schematic diagram of a structure of an electronic device according to an embodiment of this application.
Figure 2C:
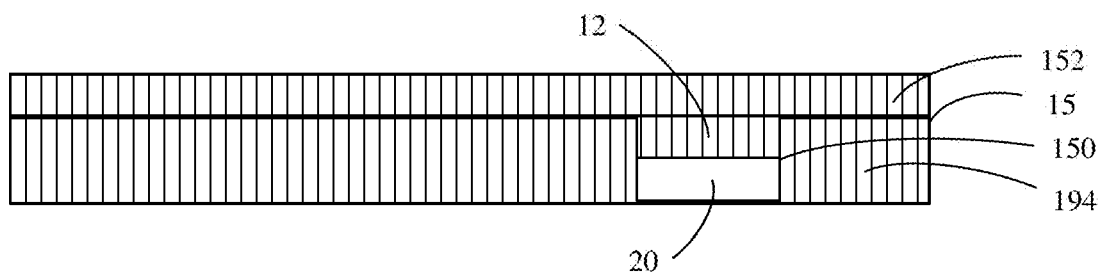
FIG. 2(c) is a schematic diagram of a screen of an electronic device according to an embodiment of this application.

For example, the electronic device 100 is a mobile phone. Refer to FIG. 2(a). A mobile phone 1 has a screen 10. The screen 10 includes a primary screen 11 and a secondary screen 12. The secondary screen 12 is disposed right above an in-screen camera. The following uses an example to describe relative position structures of the primary screen 11, the secondary screen 12, and the in-screen camera with reference to FIG. 2(b) and FIG. 2(c). As shown in FIG. 2(b), the mobile phone 1 may sequentially include a rear cover 13, a mainboard 14, and a screen module 15 from bottom to top. The screen module 15 includes a display 194 and a touch layer 152 from bottom to top. For a higher screen-to-body ratio, a small hole 150 (a shaded part in FIG. 2(b)) may be disposed in the display 194 to dispose a camera 20. Generally, the camera 20 is a front-facing camera. Refer to FIG. 2(c). The camera 20 is disposed in the small hole 150, and the secondary screen 12 is disposed right above the camera 20, so that the camera 20 becomes a camera below the secondary screen 12. Optionally, the secondary screen 12 is an LCD. A shape of the secondary screen 12 may be any shape such as a circle, a square, or a rectangle. This is not limited in this embodiment of this application.

Figure 2D:
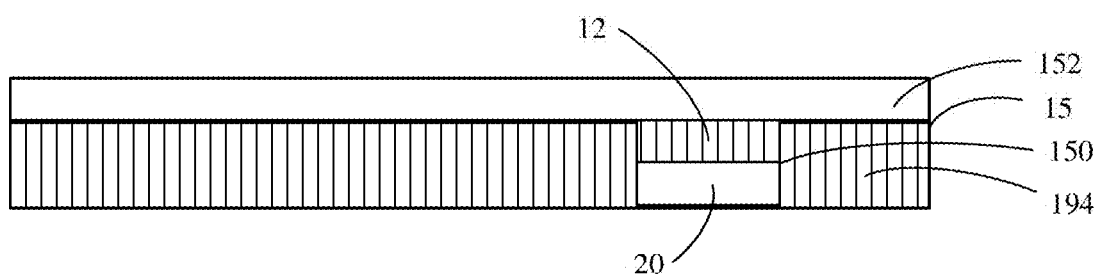
FIG. 2(d) is a schematic diagram of another screen of an electronic device according to an embodiment of this application.

FIG. 2(a) to FIG. 2(c) are described by using an example in which the screen 10 includes the display 194 and the touch layer 152, and the screen 10 is a touchscreen. In some other embodiments, the screen 10 may include the display 194 but not the touch layer 152. For example, as shown in FIG. 2(d), the screen 10 is an area shown in a vertical line part in FIG. 2(d).

The ISP is configured to process data fed back by the camera 193. For example, during photography, a shutter is pressed, and light is transmitted to a photosensitive element of the camera through a lens. The photosensitive element of the camera converts an optical signal into an electrical signal, and transmits the electrical signal to the ISP for processing. The ISP converts the electrical signal into a visible image. The ISP may further perform algorithm optimization on noise, brightness, and complexion of the image. The ISP may further optimize parameters such as exposure and a color temperature of a photography scenario. In some embodiments, the ISP may be disposed in the camera 193.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more video codecs. Therefore, the electronic device 100 may play or record videos in a plurality of encoding formats, for example, moving picture experts group (MPEG)-1, MPEG-2, MPEG-3, and MPEG-4.

The electronic device 100 implements a display function through the GPU, the display 194, the application processor, and the like. The GPU is a microprocessor for image processing, and is connected to the display 194 and the application processor. The GPU is configured to perform: mathematical and geometric calculation, and render an image. The processor 110 may include one or more GPUs that execute program instructions to generate or change display information.

The NPU is a neural-network (NN) computing processor, quickly processes input information by referring to a structure of a biological neural network, for example, by referring to a mode of transmission between human brain neurons, and may further continuously perform self-learning. The electronic device 100 may implement applications such as intelligent cognition through the NPU, for example, image recognition, facial recognition, speech recognition, and text understanding.

The external memory interface 120 may be configured to connect to an external memory card such as a Micro SD card, to extend a storage capability of the electronic device 100. The external memory card communicates with the processor 110 through the external memory interface 120, to implement a data storage function. For example, files such as music and a video are stored in the external memory card.

The internal memory 121 may be configured to store computer-executable program code. The executable program code includes instructions. The processor 110 runs the instructions stored in the internal memory 121, to implement various function applications and data processing of the electronic device 100. The internal memory 121 may include a program storage area and a data storage area. The program storage area may store an operating system, an application required by at least one function (for example, a sound playing function and an image playing function), and the like. The data storage area may store data (for example, audio data and a phone book) created when the electronic device 100 is used, and the like. In addition, the internal memory 121 may include a high-speed random access memory, or may include a nonvolatile memory, for example, at least one magnetic disk storage device, a flash memory, or a universal flash storage (UFS).

In some embodiments, the processor 110 controls, by running instructions stored in the internal memory 121, the secondary screen 12 to prompt a communication message after the primary screen 11 is turned off, and controls the secondary screen 12 to display a status parameter of the electronic device 100 after the primary screen 11 is turned on.

The electronic device 100 may implement audio functions by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an audio electrical signal into a sound signal. The user of the electronic device 100 may listen to music or answer a hands-free call through the speaker 170A.

The receiver 170B, also referred to as an "earpiece", is configured to convert an audio electrical signal into a sound signal. When the user of the electronic device 100 answers a call or listens to a voice message, the receiver 170B may be placed near a human ear to listen to a voice.

The microphone 170C, also referred to as a "mike" or a "mic", is configured to convert a sound signal into an electrical signal. When making a call or sending a voice message, the user may make a sound near the microphone 170C through the mouth, to enter a sound signal to the microphone 170C. At least one microphone 170C may be disposed in the electronic device 100. In some other embodiments, two microphones 170C may be disposed in the electronic device 100, to implement a noise reduction function in addition to a function of collecting a sound signal. In some other embodiments, three, four, or more microphones 170C may be alternatively disposed in the electronic device 100, to collect a sound signal, implement noise reduction, and identify a sound source, so as to implement a directional recording function and the like.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When force is applied to the pressure sensor 180A, a capacitance between electrodes changes. The electronic device 100 determines pressure strength based on a change of the capacitance. When a touch operation is performed on the display 194, the electronic device 100 detects a strength of the touch operation through the pressure sensor 180A. The electronic device 100 may calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on an icon of Messages, an instruction for viewing an SMS message is executed. When a touch operation whose touch operation intensity is greater than or equal to the first pressure threshold is performed on an icon of Messages, an instruction for creating an SMS message is executed.

The gyroscope sensor 180B may be configured to determine a motion posture of the electronic device 100. In some embodiments, an angular velocity of the electronic device 100 around three axes (namely, axes x, y, and z) may be determined through the gyroscope sensor 180B. The gyroscope sensor 180B may be configured to implement image stabilization during photography. For example, when the shutter is pressed, the gyroscope sensor 180B detects an angle through which the electronic device 100 moves, and calculates, based on the angle, a distance for which a lens module needs to compensate, so that the lens cancels the shake of the electronic device 100 through reverse motion, thereby implementing the image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall effect sensor. The electronic device 100 may detect opening and closing of a flip cover by using the magnetic sensor 180D. In some embodiments, when the electronic device 100 is a clamshell phone, the electronic device 100 may detect opening and closing of a clamshell by using the magnetic sensor 180D. Further, a feature such as automatic unlocking upon opening of the flip cover is set based on a detected opening or closing state of the flip cover or a detected opening or closing state of the clamshell.

The acceleration sensor 180E may detect a magnitude of an acceleration of the electronic device 100 in each direction (usually, on three axes). When the electronic device 100 is still, a magnitude and a direction of gravity may be detected. The acceleration sensor may be further configured to identify a posture of the electronic device, and is used in an application such as switching between a landscape mode and a portrait mode, or a pedometer.

The distance sensor 180F is configured to measure a distance. The electronic device 100 may measure a distance in an infrared or a laser manner. In some embodiments, in a photography scenario, the electronic device 100 may measure a distance by using the distance sensor 180F, to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects, by using the photodiode, infrared reflected light that comes from a nearby object. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user holds the electronic device 100 close to an ear for a call, to automatically perform screen-off to save power. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photography. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photography, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption and implement thermal protection. In some other embodiments, when the temperature is less than another threshold, the electronic device 100 heats up the battery 142, to avoid abnormal shutdown of the electronic device 100 due to a low temperature. In some other embodiments, when the temperature is less than still another threshold, the electronic device 100 boosts an output voltage of the battery 142, to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touchscreen". In some embodiments, the screen 10 may be a touchscreen.

The touch sensor 180K is configured to detect a touch operation performed on or near the touch sensor 180K. The touch sensor may transfer the detected touch operation to the application processor, to determine a type of a touch event. A visual output related to the touch operation may be provided on the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord. The bone conduction sensor 180M may also be able to detect a human pulse, and receive a blood pressure signal. In some embodiments, the bone conduction sensor 180M may also be disposed in the headset, to obtain a bone conduction headset. The audio module 170 may obtain a voice signal through parsing based on the vibration signal that is of the vibration bone of the vocal-cord and that is obtained by the bone conduction sensor 180M, to implement a voice function. The application processor may parse heart rate information based on the blood pressure signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to user settings and function control of the electronic device 100.

The motor 191 may generate a vibration prompt. The motor 191 may be configured to provide an incoming call vibration prompt or a touch vibration feedback. For example, touch operations performed on different applications (for example, photography and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 is also compatible with different types of SIM cards. The SIM card interface 195 is also compatible with an external storage card. The electronic device 100 interacts with a network by using the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

In this embodiment of this application, after the primary screen 11 is turned off, if the processor 110 detects a notification message, the processor 110 generates prompt information corresponding to the notification message. Then, the secondary screen 12 displays the prompt information to prompt the user that the notification message has been received. In this way, the electronic device displays the prompt information of the notification message by using the secondary screen, so that the user can notice a message notification in time. A notification effect for the user is relatively good, and user experience is improved.

A software system of the electronic device 100 may use a layered architecture, an event-driven architecture, a microkernel architecture, a micro service architecture, or a cloud architecture. In this embodiment of this application, an Android system with a layered architecture is used as an example to describe an Android device display architecture in which an electronic device displays information on a secondary screen when a primary screen is turned off.

Figure 3:
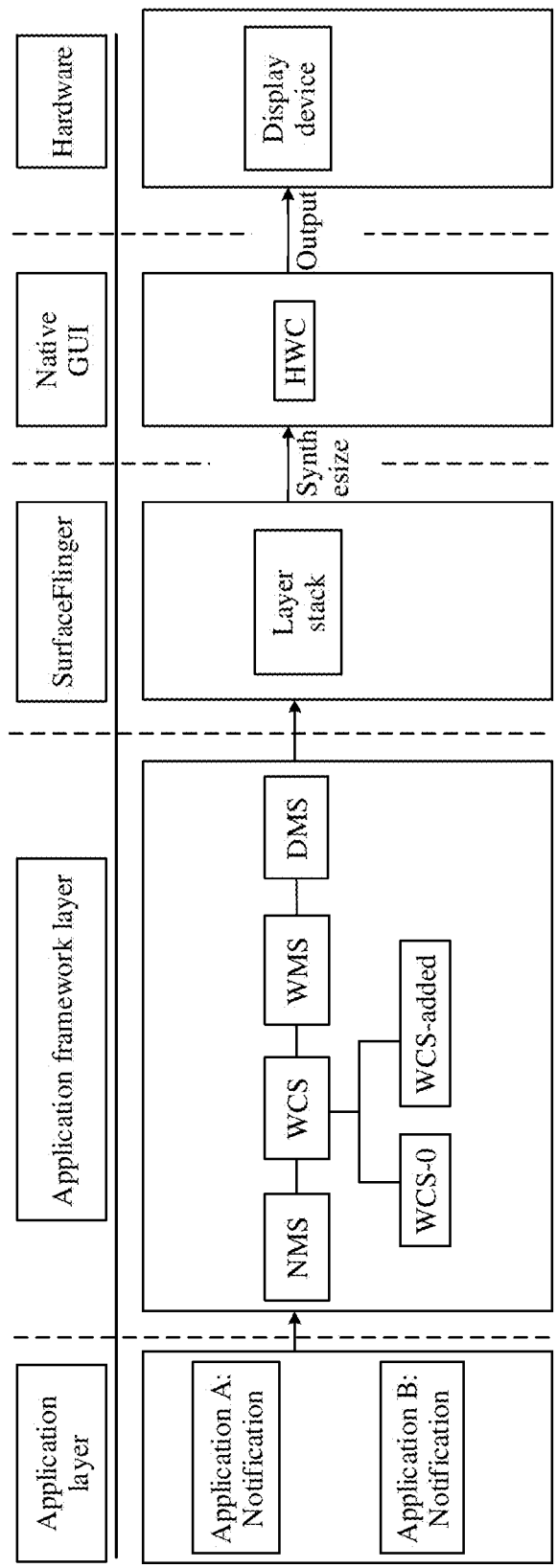
FIG. 3 is a screen information display architecture of an electronic device according to an embodiment of this application.

Refer to FIG. 3. The display architecture is a layered architecture implementation, and includes an application layer, an application framework layer, a SurfaceFlinger layer, a Native GUI layer, and a hardware layer from top to bottom. FIG. 3 is a block diagram of a software structure of the electronic device 100 according to an embodiment of this application. Each layer has clear roles and responsibilities. Layers communicate with each other through a software interface.

The application layer may include applications such as Camera, Gallery, Calendar, Phone, Maps, Navigation, WLAN, Bluetooth, Music, Videos, and Messages. In the solution of this application, the application layer is mainly responsible for sending various notification messages, which may include an application notification message and a system prompt message. As shown in FIG. 3, after messages from an application A and an application B are received, message notifications from the application A and the application B are sent. For example, after WeChat receives a WeChat message notification, the application layer sends the WeChat message notification to the application framework layer.

The application framework layer provides an application programming interface (API) and a programming framework for an application at the application layer. In the solution of this application, a notification manager service (NMS) at the application framework layer receives an application message notification, and then further transmits the application message notification to a windows compose service (WCS). The windows compose service includes an existing windows compose service WCS-0 in an existing Android device display architecture and a newly added windows compose service WCS-added in the solution of this application. The existing windows compose service WCS-0 in the Android device display architecture is used for display of a primary screen, and is a part of the conventional technology. Details are not described herein again. The newly added windows compose service WCS-added in the solution of this application is used for display of a secondary screen, and is mainly responsible for obtaining a notification message and information corresponding to the notification message. The information corresponding to the notification message includes an application icon, an application name, and the like. Then, the newly added windows compose service WCS-added transmits the obtained notification message and the corresponding information to a windows manager service (WMS), and the windows manager service generates a Windows form based on the notification message and the corresponding information. The Windows form is transmitted to a display manager service (DMS). After receiving the Windows form, the display manager service performs display management on the Windows form to obtain display content, and then sends the display content to the SurfaceFlinger layer.

The Surfaceflinger layer is responsible for synthesizing the display content, synthesizes to-be-displayed information into a frame of image, and presents the frame of image as a layer stack (LayerStack). Then, the Surfaceflinger layer transmits the synthesized frame of image to the Native GUI.

The Native GUI is responsible for displaying the synthesized frame of image. For example, the Native GUI used for off-screen display in the solution of this application may be a graphics card, and the synthesized image is displayed by using an HardwareComposer (HWC) function in the graphics card.

Finally, the Native GUI is connected to the hardware, and an image that needs to be displayed is output to a hardware display device, and an image that a user finally views is presented by using the hardware display device. The hardware display device may be an LCD display.

That is, when the primary screen is turned off, the application layer detects the notification message, and sends the notification message to the application framework layer. The application framework layer receives the notification message, obtains the notification message and prompt information corresponding to the notification message by using the newly added windows compose service WCS-added, generates the Windows form based on the notification message and the prompt information corresponding to the notification message, and then performs display management on the generated Windows form to obtain display content to be displayed on the secondary screen. Then, the display content is transferred to the Surfaceflinger layer to synthesize the display content. Then, the synthesized display content is displayed by using the Native GUI, and finally content of the prompt information that is used to prompt that the notification message has been received and that is viewed by the user is presented by using the secondary screen.

As described above, the Surfaceflinger and the Native GUI are respectively used to represent names of layers in the layered architecture.

In this embodiment of this application, message display of the electronic device on the secondary screen is completed by using the Android device display architecture shown in FIG. 3. As shown in FIG. 3, the application layer detects the notification message, and sends the notification message to the application framework layer. The application framework layer receives the notification message, obtains the notification message and the information corresponding to the notification message by using the newly added windows compose service WCS-added, generates the Windows form based on the notification message and the information corresponding to the notification message, and then performs display management on the generated Windows form to obtain the display content to be displayed on the secondary screen 12. Then, the display content is transferred to the Surfaceflinger layer to synthesize the display content. Then, the synthesized display content is displayed by using the Native GUI, and finally the prompt information viewed by the user is presented by using the secondary screen 12.

Figure 4:
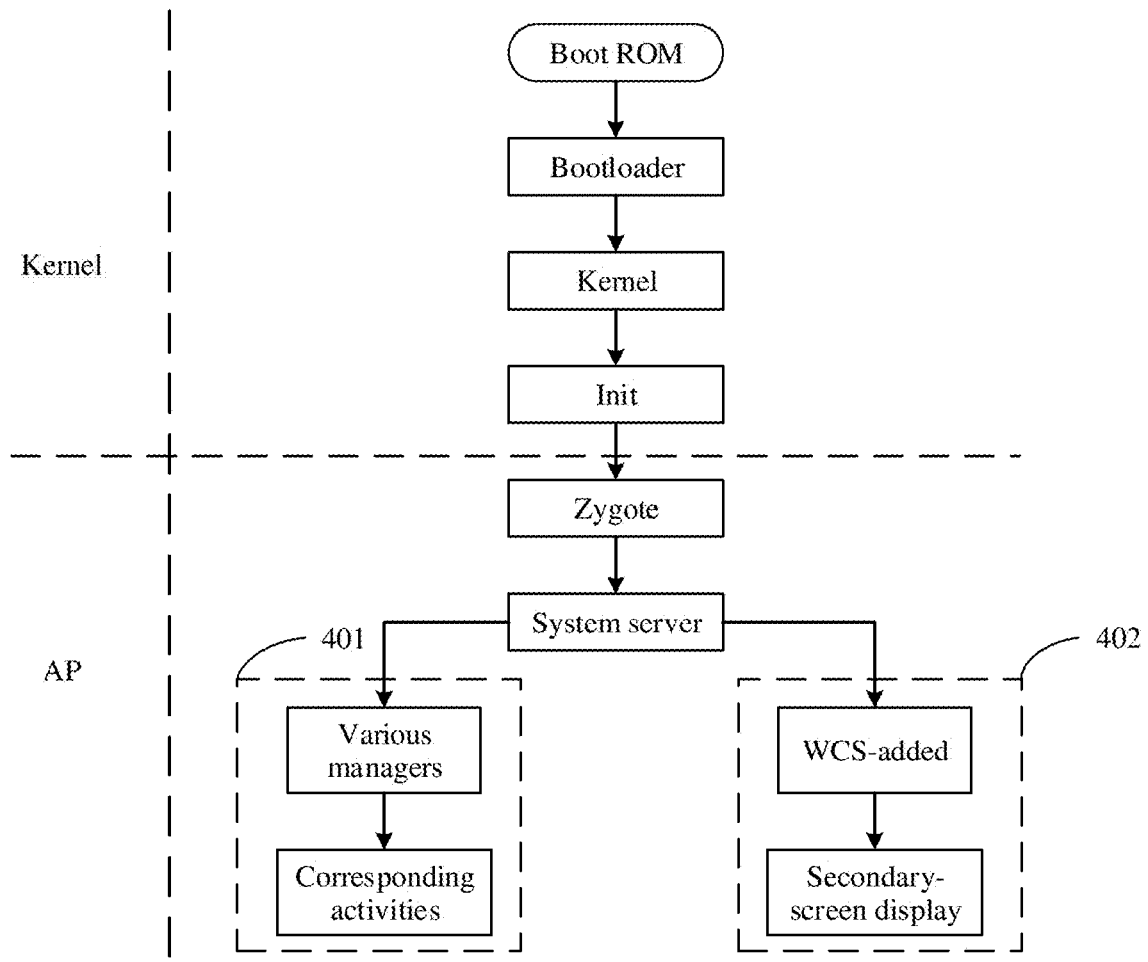
FIG. 4 is a flowchart of screen information display of an electronic device according to an embodiment of this application.

Refer to FIG. 4. The newly added windows compose service WCS-added is added to a system service of the electronic device by using the following procedure, so as to schedule display of the secondary screen.

As shown in FIG. 4, the procedure starts with a Boot ROM. The Boot ROM is used to boot a ROM interface, and construct a diskless workstation by using a boot service. Then, a Boot Loader boots loading and boots a kernel. Then, the kernel starts, and is used to start a virtual machine. After the kernel is started, an Init process is started. An Init is a user-level process started by the kernel, is the first process started after the kernel is started, and is used to boot a Zygote. The Zygote is a core process for creating a new process in an entire system. A system server (SS) process is created by using the Zygote. A main function of the system server process is to start various system management services. Block 401 shows various managers existing in a system server and corresponding activities managed by the managers. In addition, as shown in block 402, in the solution of this application, the WCS-added is added to the system server, and the newly added WCS-added is used to generate content displayed on the secondary screen 12, and finally form a display on the secondary screen 12. As shown in FIG. 4, the Boot ROM, the Boot Loader, the kernel, and the Init jointly form a kernel part, and is configured to start the virtual machine. The Zygote, the system server, various managers in the system server, and the WCS-added jointly form an application processor (AP), and is configured to complete various activities, including display of the secondary screen.

The Boot ROM, the Boot Loader, the kernel, the Init, and the Zygote respectively represent names of modules involved in completing a secondary screen display process.

Figures 1, 9A:
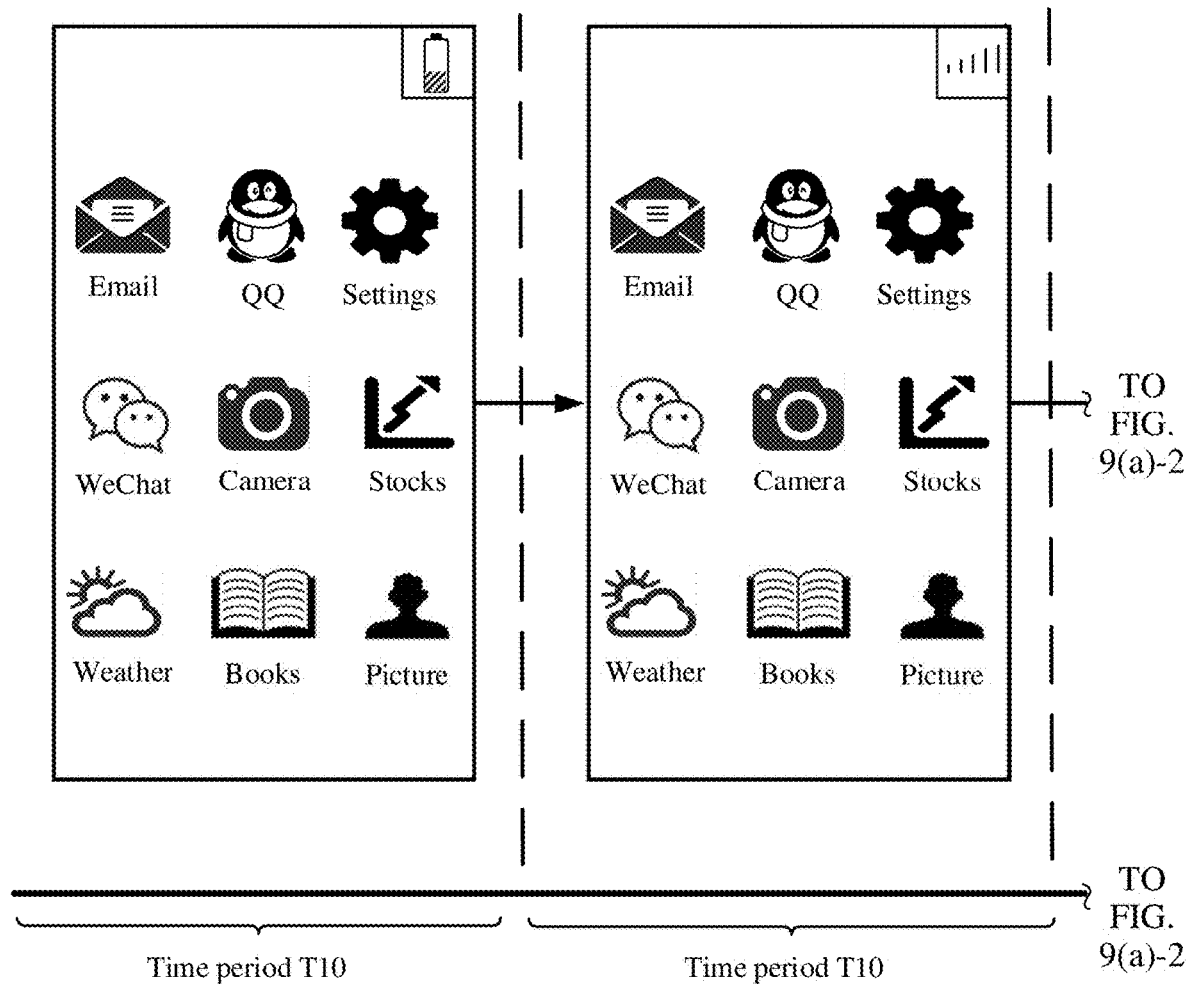
Figures 2, 9A:
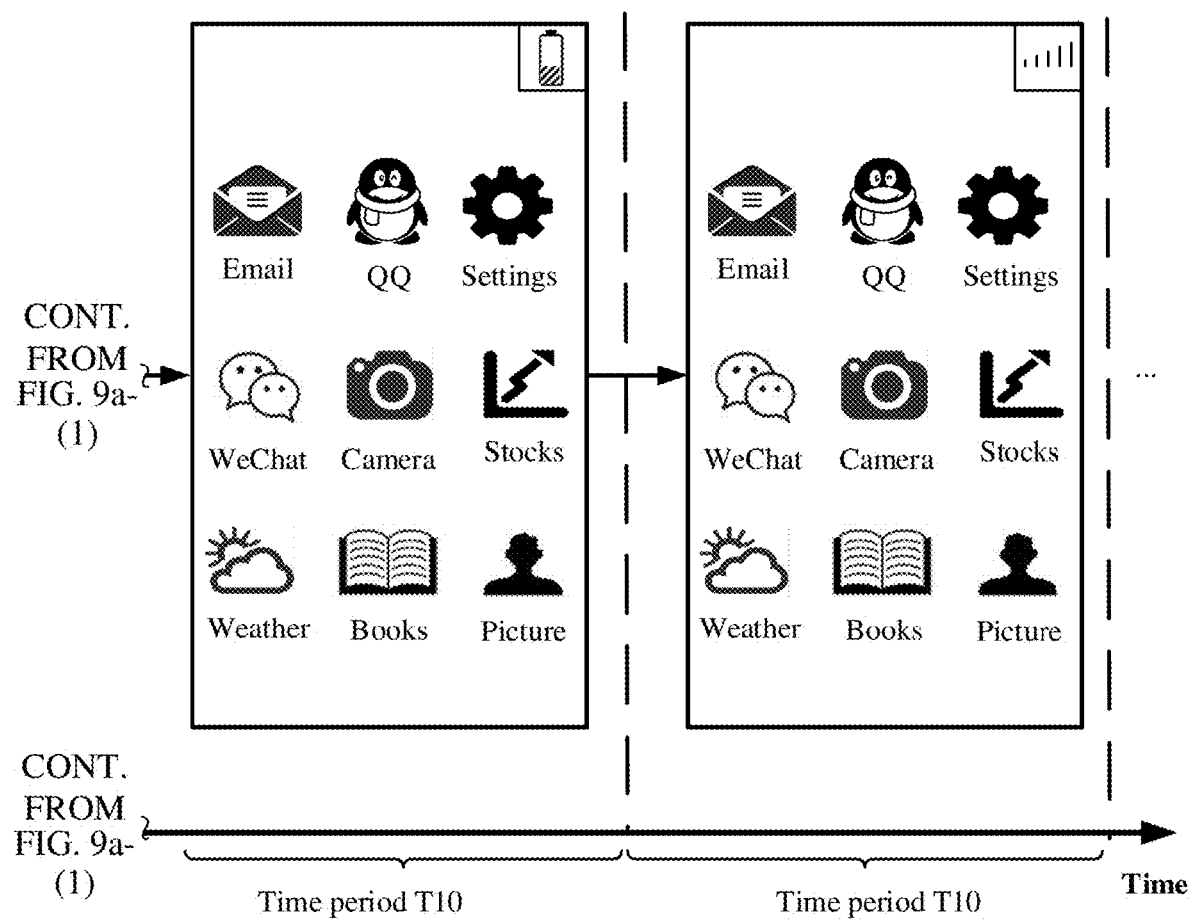

For ease of understanding, in the following embodiments of this application, an example in which the electronic device is a mobile phone having a structure shown in FIG. 1 to FIG. 3 is used. The message notification method applied to the electronic device provided in the embodiments of this application is specifically described with reference to the accompanying drawings.

Figure 5:
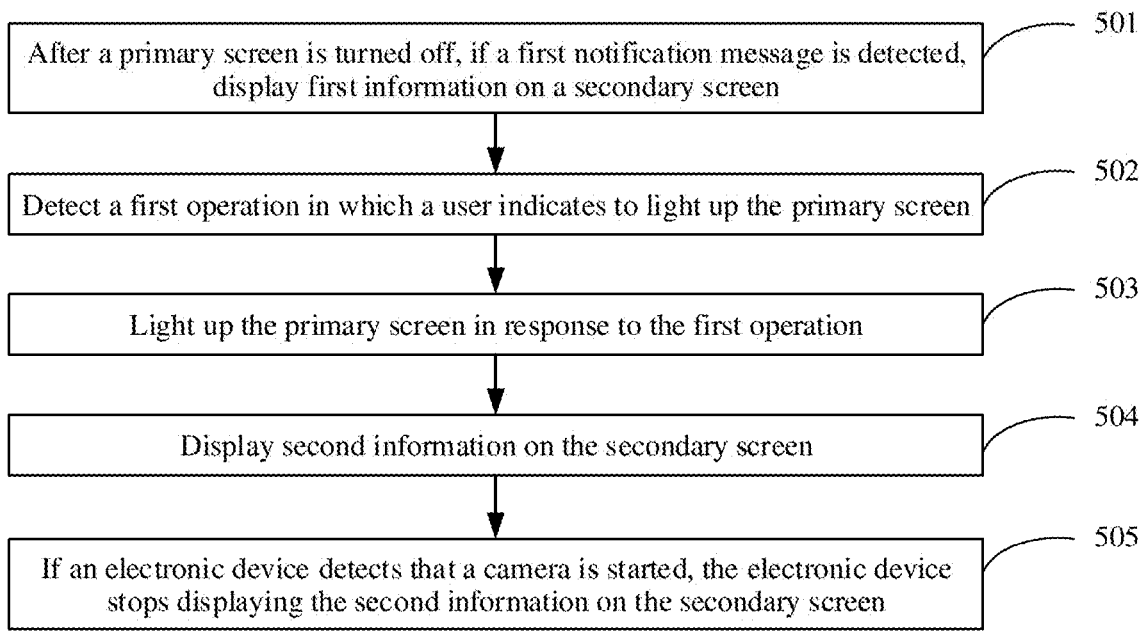
FIG. 5 is a flowchart of a message notification method according to an embodiment of this application.

Refer to FIG. 5. The message notification method may include the following steps.

501: After a primary screen is turned off, if the electronic device detects a first notification message, the electronic device displays first information on a secondary screen, where the first information is used to prompt a user that the first notification message has been received.

After the primary screen is turned off, if the electronic device detects the first notification message, the electronic device displays the first information on the secondary screen, to prompt the user that the first notification message has been received. Compared with the solution in the conventional technology that an indicator is disposed on the top or a side of a mobile phone, and consequently a message notification is not easily noticed by the user, and a notification effect is relatively poor, in the solution of this embodiment of this application, the user is prompted with the notification message by using the secondary screen, so that the user can notice a message notification in time. A notification effect for the user is relatively good, and user experience is improved.

The first notification message may be various notification messages. For example, the first notification message may be a WeChat notification message, a Weibo notification message, a mailbox notification message, an SMS message notification message, a phone notification message, a low-battery notification message, or the like. A type of the first notification message is not limited in this embodiment of this application.

Figures 6A, 6B:
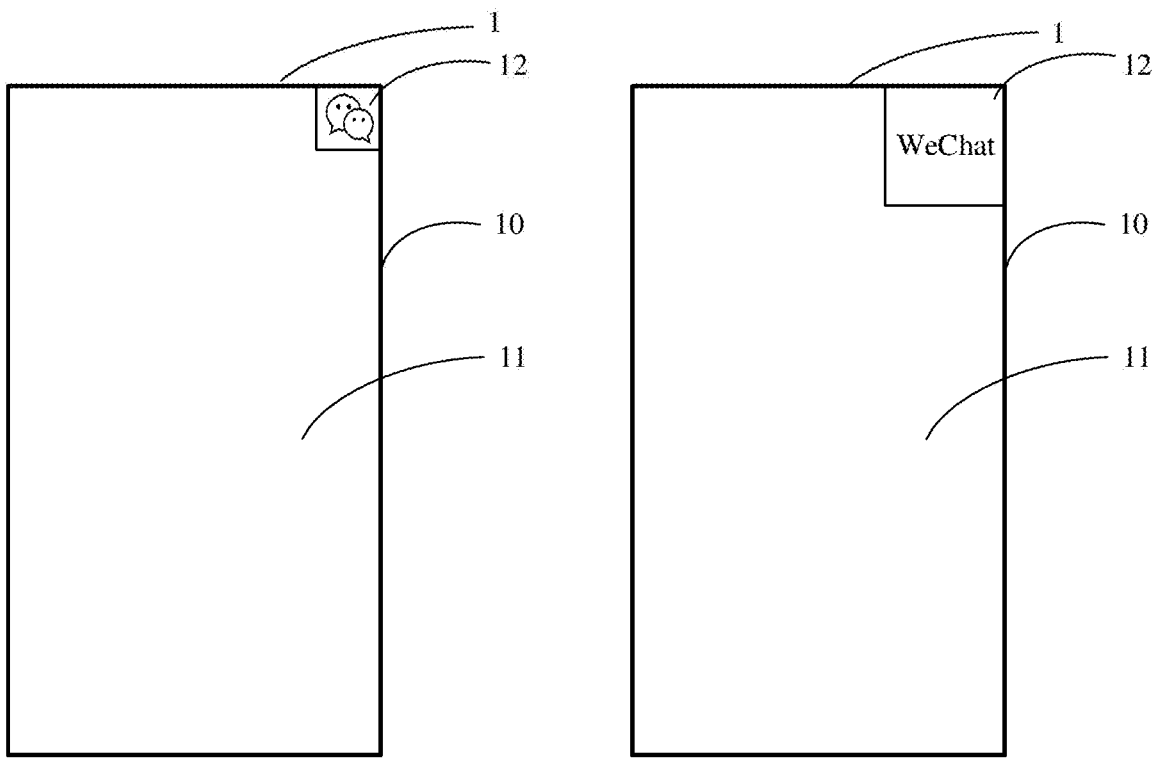
FIG. 6(a) is a schematic diagram of a message notification interface according to an embodiment of this application.
FIG. 6(b) is a schematic diagram of another message notification interface according to an embodiment of this application.
Figure 6C:
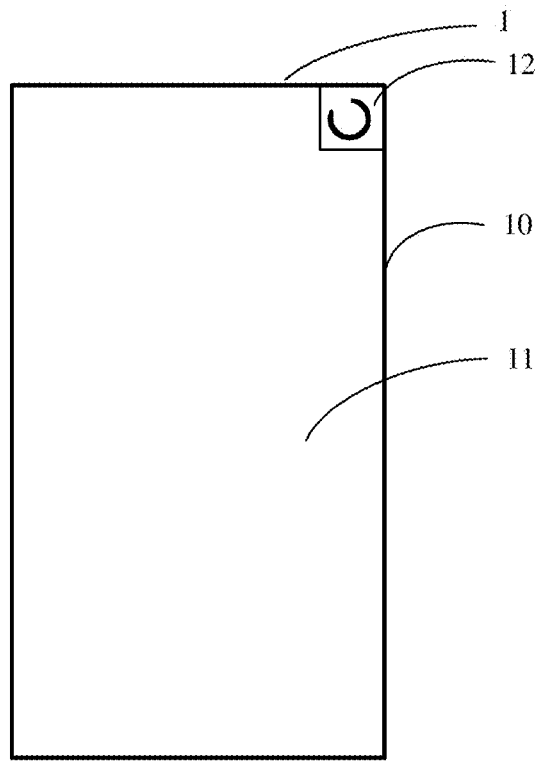
FIG. 6(c) is a schematic diagram of another message notification interface according to an embodiment of this application.
Figure 6D:
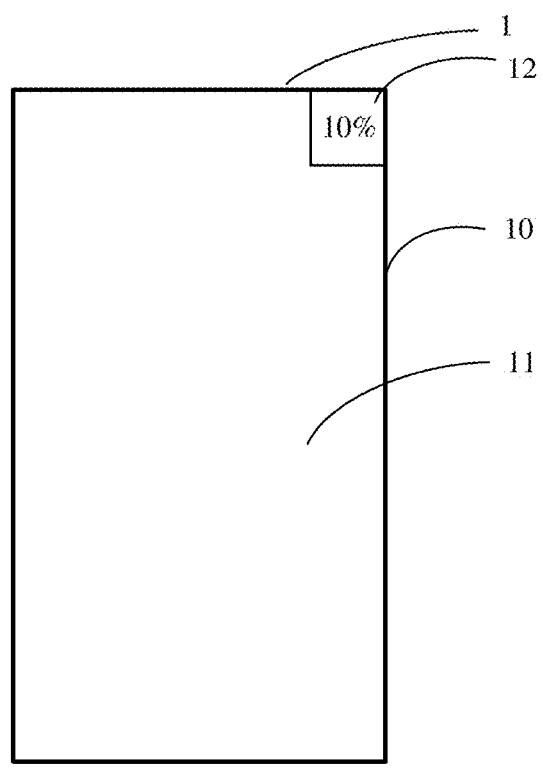
FIG. 6(d) is a schematic diagram of another message notification interface according to an embodiment of this application.
Figure 6E:
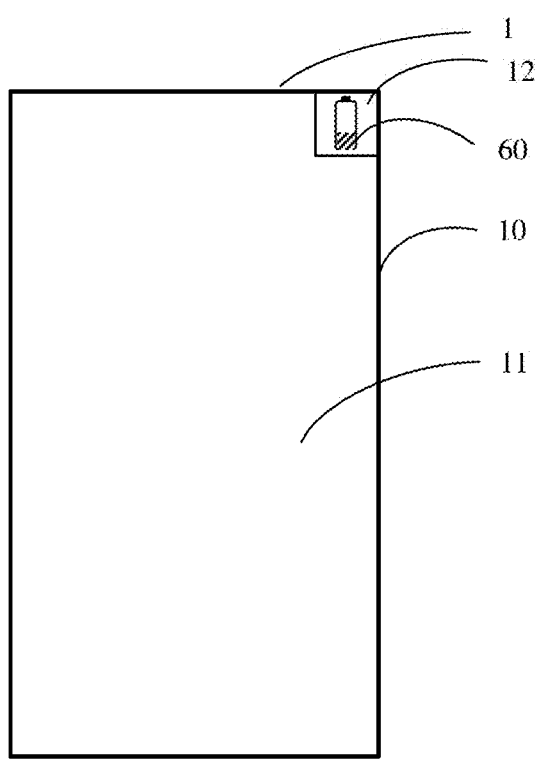
FIG. 6(e) is a schematic diagram of another message notification interface according to an embodiment of this application.

The first information may include an application icon or an application name corresponding to the first notification message, and may further include other information that can be displayed on the secondary screen and that indicates the first notification message. A type of the first information is not limited in this embodiment of this application. For example, FIG. 6(a) and FIG. 6(b) show an example of the first information when the first notification message is a WeChat notification message. The first information in FIG. 6(a) is a WeChat application icon. The first information in FIG. 6(b) is a WeChat application name. FIG. 6(c) to FIG. 6(e) show examples of the first information when the first notification message is a battery level notification message. The first information in FIG. 6(c) is a prompt of a circular status icon of a battery level. The first information in FIG. 6(d) is a text prompt of the battery level. The first information in FIG. 6(e) is a prompt of a specific color background of the battery level. In FIG. 6(e), a shaded part 60 in a battery level icon on the secondary screen displays different color backgrounds based on different battery levels, for example, when the battery level is 0% to 30%, the color background of the shaded part 60 is red; when the battery level is greater than 30% and less than 60%, the color background of the shaded part 60 is blue; and when the battery level is greater than 60%, the color background of the shaded part 60 is green. Only an example of the specific color background that varies with the battery level is described herein. However, the prompt of the specific color background of the battery level is not limited thereto. The user may set the specific color background in a settings menu based on a use habit. This is not limited in this embodiment of this application.

The electronic device may display the first information on the secondary screen in a plurality of manners.

In an embodiment, the electronic device turns on the secondary screen to notify the user, or the electronic device intermittently turns on the secondary screen to notify the user, or the electronic device dynamically displays a first interface element on the secondary screen to notify the user. The electronic device displays the first information on the secondary screen after detecting a first operation of picking up the electronic device by the user.

In other words, the electronic device first prompts the user by turning on the secondary screen on the secondary screen or dynamically displaying an interface element on the secondary screen, and then displays the first information on the secondary screen when the user picks up the mobile phone, so as to further prompt, by using the first information, the user with specific information corresponding to the first notification message.

Figure 7A:
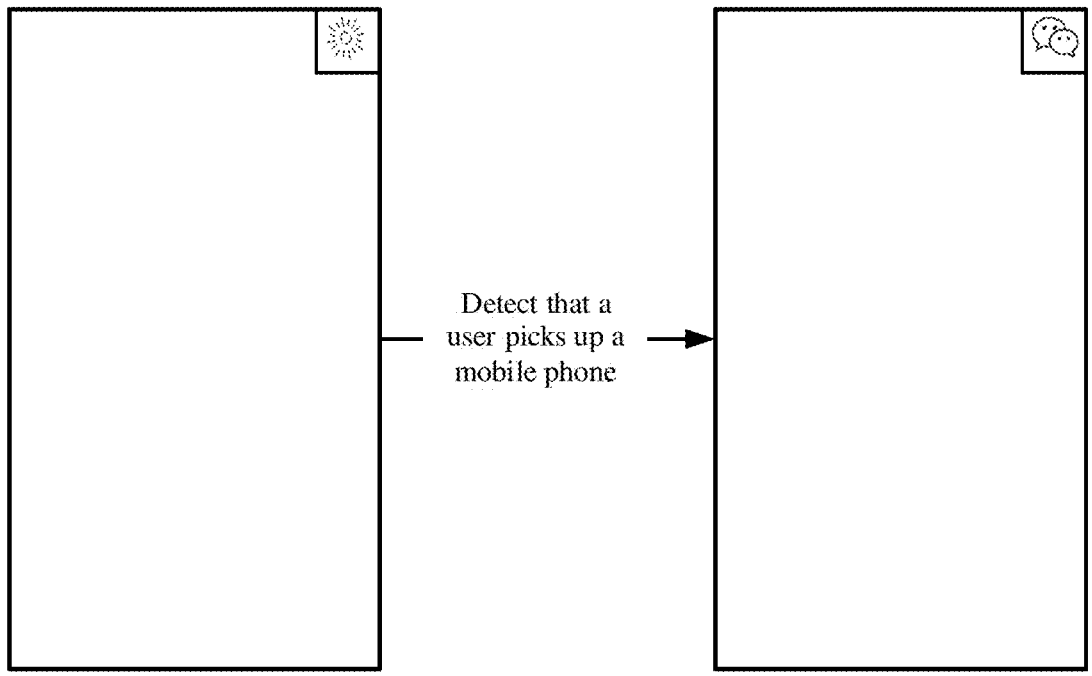
FIG. 7(a) is a schematic diagram of a message notification manner including a message according to an embodiment of this application.

That the electronic device turns on the secondary screen to notify the user, or the electronic device intermittently turns on the secondary screen to notify the user, or the electronic device dynamically displays a first interface element on the secondary screen is to simulate lights of the indicator to notify the user. For example, refer to FIG. 7(a). When detecting the WeChat notification message, the mobile phone simulates the indicator on the secondary screen to perform light notification. In this case, if the user notices the light notification and picks up the mobile phone for viewing, the electronic device displays the application icon of the WeChat notification message on the secondary screen after detecting an operation of picking up the mobile phone by the user.

For example, that the electronic device turns on the secondary screen to notify the user is keeping the secondary screen steadily on until the user notices the steady on light notification and picks up the mobile phone. That the electronic device intermittently lights the secondary screen to notify the user is generating a blinking notification effect of "screen-on—screen-off—screen-on" on the secondary screen. There may also be a plurality of blinking notification periodicities. For example, the indicator is on for 0.5 s, off for Is, and then on for 0.5 s, and blinking notification is performed in this cycle. Alternatively, the indicator is on for 1 s, off for 1 s, and then on for 1 s, and blinking notification is performed in this cycle. The blinking notification periodicity is not limited in this embodiment of this application, and the user may set the blinking notification periodicity in the settings menu of the mobile phone. The blinking notification manner may be used to simulate a blinking effect of a breathing indicator to notify the user. In addition, the first interface element may be a dynamically rotating color circle, or may be another element or symbol with a dynamic effect. This is not limited in this embodiment of this application. The user is prompted by dynamically displaying the first interface element on the secondary screen. In addition, if the user notices the notification and picks up the mobile phone for viewing, the electronic device displays the application icon of the WeChat notification message on the secondary screen after detecting the operation of picking up the mobile phone by the user.

For example, the mobile phone may detect, by using a sensor disposed in the mobile phone, the operation of picking up the mobile phone by the user. These sensors may include a gyroscope sensor, an acceleration sensor, a gravity sensor, and the like. For example, if the gyroscope detects that a posture of the mobile phone changes from a horizontally-placed state to a tilted state, or the acceleration sensor detects that an acceleration of the mobile phone in some direction changes, it may indicate that the user has picked up the mobile phone. Alternatively, a grip sensor or a handheld sensor may be disposed in the mobile phone, and when it is detected that the user holds the mobile phone, it may be determined that the user has picked up the mobile phone.

In another embodiment, the indicator may not be simulated, and the first information is directly displayed on the secondary screen after the first notification message is detected.

Figure 7B:
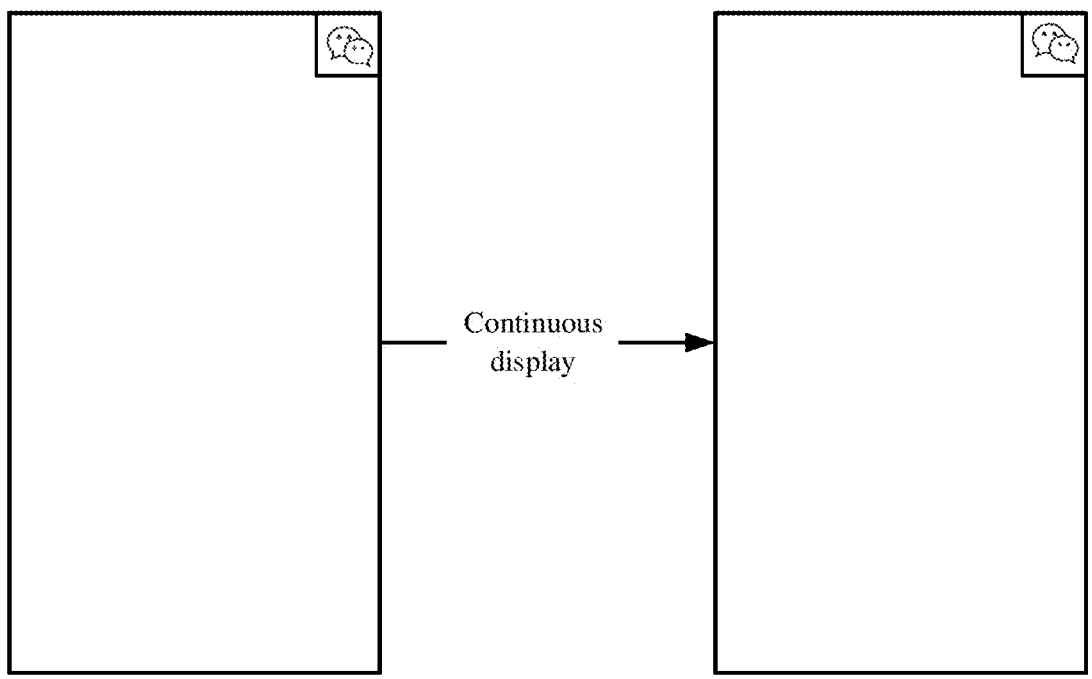
FIG. 7(b) is a schematic diagram of another message notification manner including a message according to an embodiment of this application.

For example, the mobile phone may continuously display the first information on the secondary screen. For example, refer to FIG. 7(b). When the mobile phone detects the WeChat notification message, the secondary screen continuously displays the application icon of the WeChat notification message.

That is, the electronic device does not use a light notification or turn off the screen on the secondary screen, and continuously displays the first information to prompt the user of the first notification message.

Figure 7C:
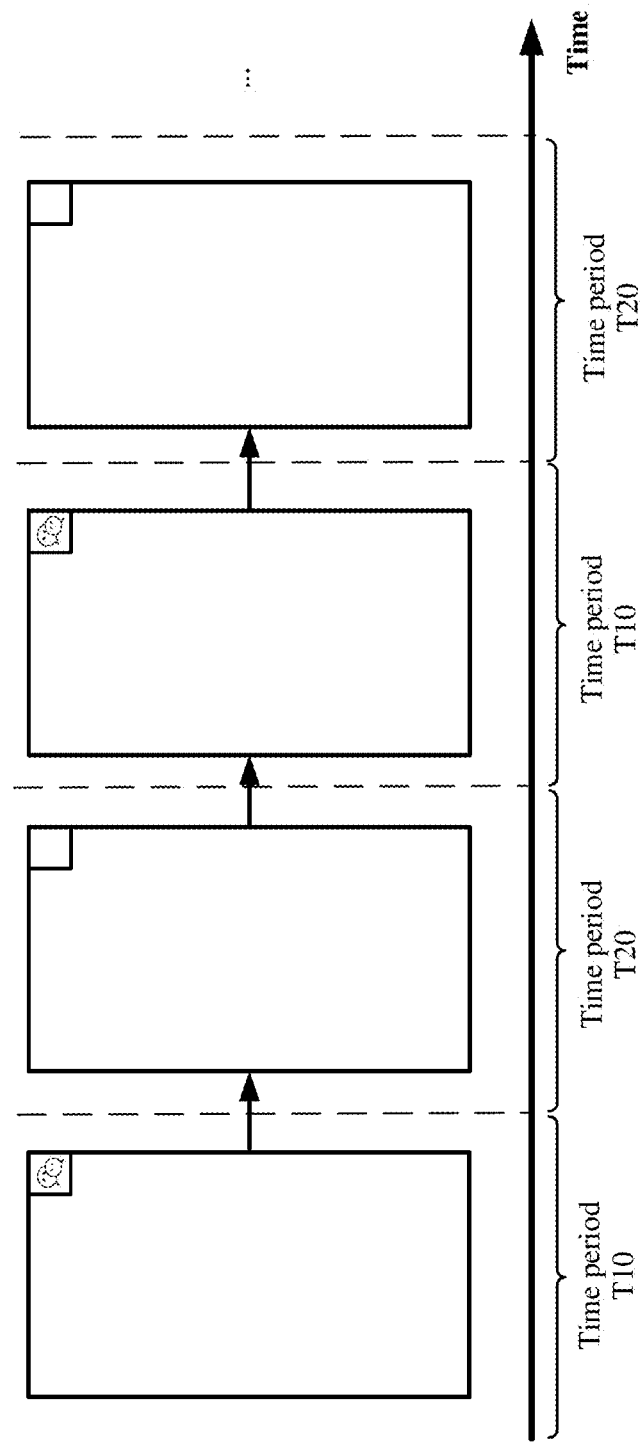
FIG. 7(c) is a schematic diagram of another message notification manner including a message according to an embodiment of this application.

For another example, that the electronic device may intermittently display the first information on the secondary screen may specifically include: intermittently displaying the first information on the secondary screen in a preset duration T. For example, the electronic device displays the first information on the secondary screen in a time period T10, keeps the screen off in a time period T20, and displays the first information again in another time period T10. For example, refer to FIG. 7(c). When the mobile phone detects the WeChat notification message, the electronic device displays the application icon of the WeChat notification message in the time period T10 on the secondary screen, keeps the screen off in the time period T20, and displays the application icon of the WeChat notification message again in another time period T10. Then, display is performed in this cycle. For example, when the electronic device detects the WeChat notification message, the electronic device first displays the application icon of the WeChat notification message for 0.5 s on the secondary screen, keeps the screen off for 1 s, and then displays the application icon of the WeChat notification message again for 0.5 s. Display is performed in this cycle.

That is, the electronic device does not use the light notification on the secondary screen, and may intermittently display the first information to complete a "display—screen-off—display" process, so as to simulate the blinking effect of an indicator, for example, simulate a breathing effect of the breathing indicator, to prompt the user of the first notification message.

The time period T10 and the time period T20 are not limited in this embodiment of this application, and the user may set the time period T10 and the time period T20 in the settings menu of the mobile phone.

It may be understood that, in a solution in which the first information is displayed after simulating the light notification, when displaying the first information on the secondary screen, the electronic device may also continuously display or intermittently display the first information.

In addition, after the electronic device detects the first notification message, the method further includes: The electronic device detects a second notification message. The second notification message and the first notification message are from different applications. That the electronic device displays the first information on the secondary screen includes: The electronic device displays the first information and third information on the secondary screen. The third information is used to prompt the user that the second notification message has been received. The first information is used to prompt the user that the first notification message has been received, and the third information is used to prompt the user that the second notification message has been received, so as to prompt the user of both the first notification message and the second notification message.

The second notification message may be various notification messages, for example, may be a WeChat notification message, a Weibo notification message, a mailbox notification message, an SMS message notification message, or a phone notification message. A type of the second notification message is not limited in this embodiment of this application.

The third information may include an application icon or an application name corresponding to the second notification message, and may further include other information that can be displayed on the secondary screen. This is not limited in this embodiment of this application.

In this embodiment of this application, the electronic device may display the first information and the third information on the secondary screen in a plurality of manners, including:

In an embodiment, the electronic device simulates the light of the indicator on the secondary screen to notify the user, and the electronic device displays the first information and the third information on the secondary screen after detecting the first operation of picking up the electronic device by the user. For example, when the first notification message is the WeChat notification message, the second notification message is the phone notification message, the first information is the WeChat application icon, and the third information is a phone application icon, the electronic device simulates the indicator on the secondary screen to perform light notification. In this case, if the user notices the light notification and picks up the mobile phone for viewing, after detecting the operation of picking up the mobile phone by the user, the electronic device displays the application icon of the WeChat notification message and the application icon of the phone notification message on the secondary screen. That the electronic device simulates the light of the indicator on the secondary screen to notify the user may include: The electronic device turns on the secondary screen to notify the user, or the electronic device intermittently turns on the secondary screen on the secondary screen to notify the user, or the electronic device dynamically displays the first interface element on the secondary screen.

Figure 8A:
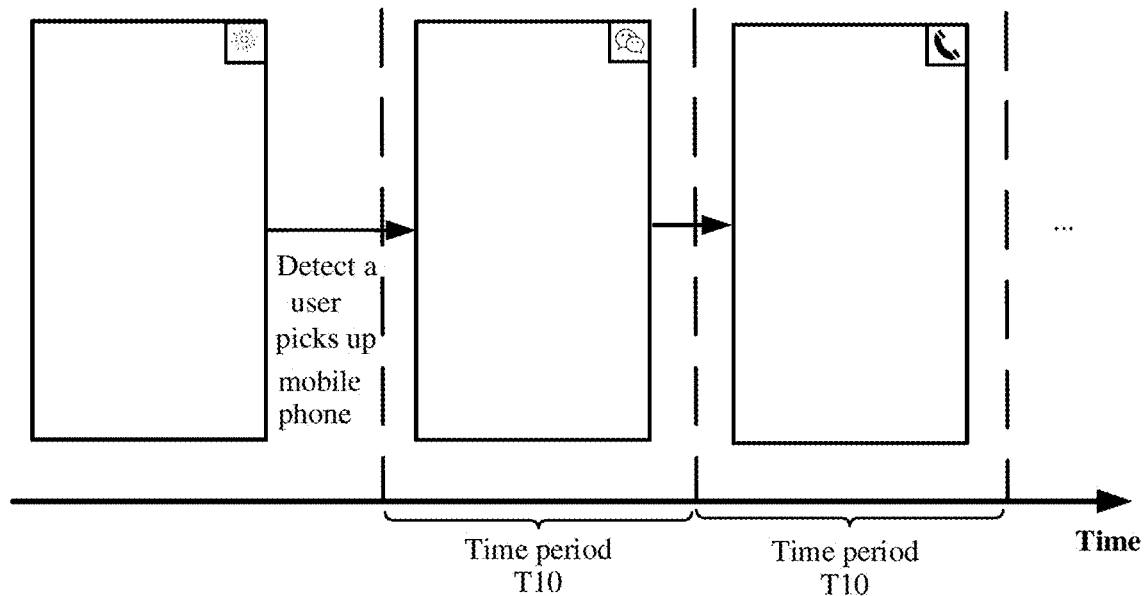
FIG. 8(a) is a schematic diagram of a message notification manner including a plurality of messages according to an embodiment of this application.

For example, refer to FIG. 8(a). The mobile phone first simulates the indicator to perform light notification on the secondary screen, and when detecting that the user picks up the mobile phone, the mobile phone starts to alternately display the application icon of the WeChat notification message and the application icon of the phone notification message on the secondary screen in preset duration T10. That is, the mobile phone first simulates the indicator to perform light notification on the secondary screen, and when it is detected that the user picks up the mobile phone, the application icon of the WeChat notification message is displayed in the time period T10, the application icon of the phone notification message is displayed in another time period T10, and then display is performed in this cycle.

In other words, the electronic device first prompts the user by using light notification, and then displays the first information and the third information when the user picks up the mobile phone, so as to prompt the user with the first notification message and the second notification message.

A manner in which the electronic device simulates the light of the indicator on the secondary screen to notify the user has been described in detail in the foregoing embodiment, and details are not described herein again.

The time period T10 may be 0.5 s, 0.8 s, 1 s, 1.5 s, or the like. The time period T10 is not limited in this embodiment of this application, and the user may set the time period T10 in the settings menu of the mobile phone.

It should be noted that the foregoing embodiment provides only an exemplary manner in which the electronic device simulates the light of the indicator on the secondary screen to notify the user, and the electronic device displays the first information and the third information on the secondary screen after detecting the first operation of picking up the electronic device by the user. However, the manner in which the electronic device simulates the light of the indicator on the secondary screen to notify the user, and the electronic device displays the first information and the third information on the secondary screen after detecting the first operation of picking up the electronic device by the user is not limited to the foregoing described embodiment, and another manner may also exist. This is not limited in this embodiment of this application.

In another embodiment, the electronic device alternately displays the first information and the third information on the secondary screen at an interval of preset duration T2.

In other words, the electronic device does not use the light notification on the secondary screen, and directly and alternately displays the first information and the third information on the secondary screen at an interval of the preset duration T2. To be specific, the electronic device does not use the light notification on the secondary screen. Instead, the preset duration T2 exists between displaying the first information and displaying the third information, where T2 is a time interval, and the secondary screen may be turned off within T2. In this way, the electronic device may simulate a blinking display effect of the indicator on the secondary screen by using such a "display—screen-off—display" process, so as to notify the user of the first notification message and the second notification message.

Figure 8B:
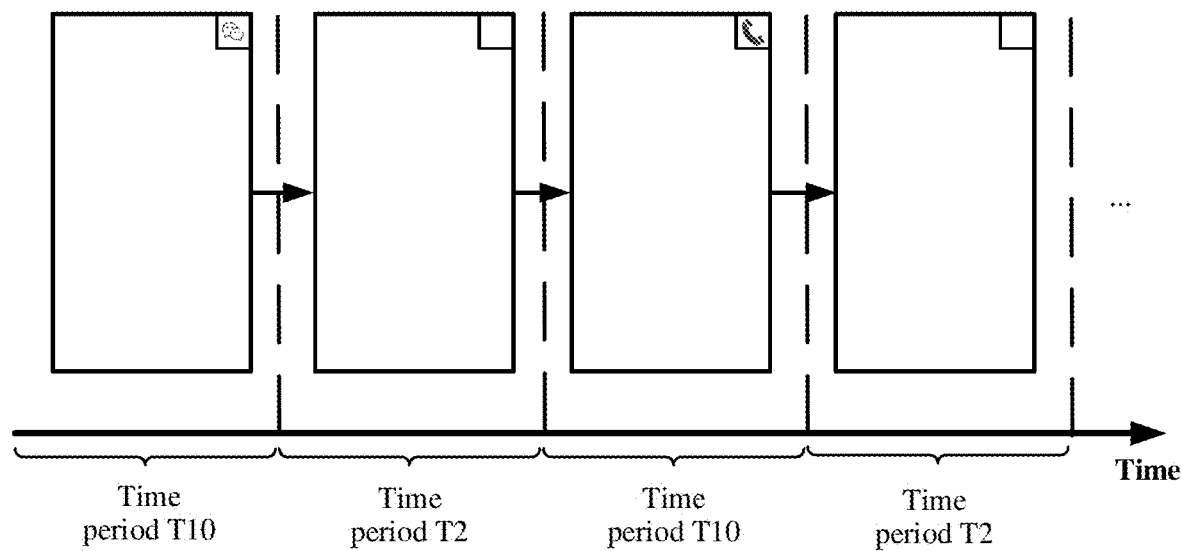
FIG. 8(b) is a schematic diagram of another message notification manner including a plurality of messages according to an embodiment of this application.

That the electronic device alternately displays the first information and the third information on the secondary screen at an interval of preset duration T2 may specifically include: The electronic device first displays the first information on the secondary screen within the time period T10, then turns off the screen within the time period T2, displays the third information within another time period T10, then turns off the screen within another time period T2, displays the first information again within still another time period T10, and then performs display in this cycle. For example, refer to FIG. 8(b). When the first notification message is the WeChat notification message, the second notification message is the phone notification message, the first information is the WeChat application icon, and the third information is the phone application icon, the electronic device first displays the application icon of the WeChat notification message on the secondary screen within the time period T10, then turns off the screen within the time period T2, displays the application icon of the phone notification message within another time period T10, then turns off the screen within another time period T2, displays the application icon of the WeChat notification message again within still another time period T10, and then performs display in this cycle.

The time period T10 and the time period T2 may be 0.5 s, 0.8 s, 1 s, 1.5 s, or the like. The time period T10 and the time period T2 are not limited in this embodiment of this application, and the user may set the time period T10 and the time period T2 in the settings menu of the mobile phone.

It should be noted that the foregoing embodiment provides only an exemplary manner in which the electronic device alternately displays the first information and the third information on the secondary screen at an interval of the preset duration T2. However, the manner in which the electronic device alternately displays the first information and the third information on the secondary screen at an interval of the preset duration T2 is not limited to the foregoing described embodiment, and another manner may also exist. This is not limited in this embodiment of this application.

In still another embodiment, the electronic device alternately displays the first information and the third information on the secondary screen at an interval of the preset duration T10.

In other words, the electronic device does not use the light notification on the secondary screen, and directly and alternately displays the first information and the third information at an interval of the preset duration T10, so as to prompt the user with the first notification message and the second notification message.

Figure 8C:
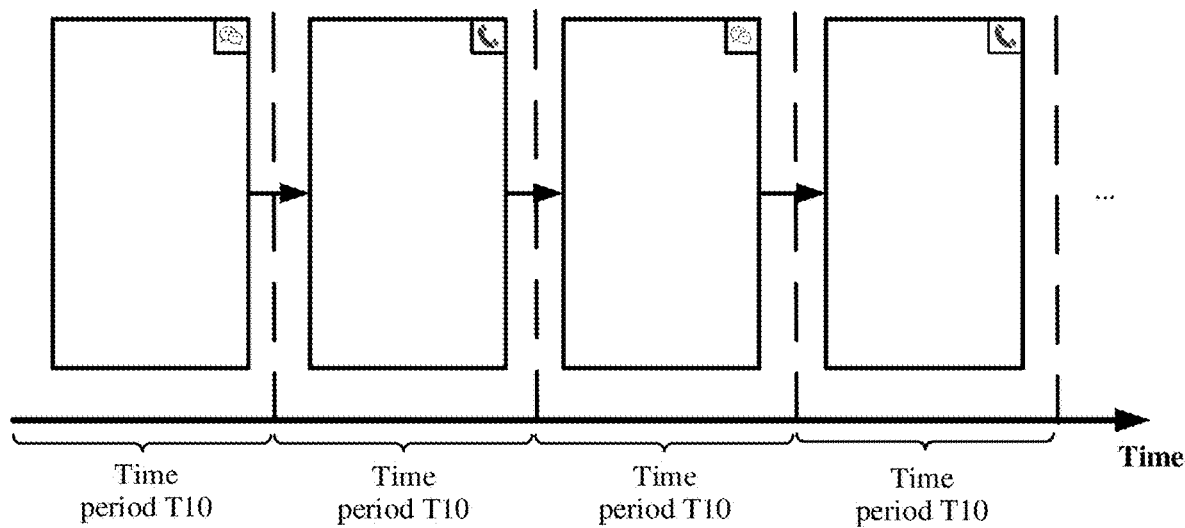
FIG. 8(c) is a schematic diagram of another message notification manner including a plurality of messages according to an embodiment of this application.

That the electronic device alternately displays the first information and the third information on the secondary screen at an interval of the preset duration T10 may specifically include: The electronic device displays the first information on the secondary screen within the time period T10, then displays the third information within another time period T10, displays the first information again within still another time period T10, and then performs display in this cycle. For example, refer to FIG. 8(c). When the first notification message is the WeChat notification message, the second notification message is the phone notification message, the first information is the WeChat application icon, and the second information is the phone application icon, the electronic device first displays the application icon of the WeChat notification message on the secondary screen within the time period T10, then displays the application icon of the phone notification message within another time period T10, displays the application icon of the WeChat notification message again within still another time period T10, and then performs display in this cycle.

The time period T10 may be 0.5 s, 0.8 s, 1 s, 1.5 s, or the like. The time period T10 is not limited in this embodiment of this application, and the user may set the time period T10 in the settings menu of the mobile phone.

It may be understood that, in a solution in which information is displayed after simulating the light notification, when the first information and the third information are displayed, a continuous display or an intermittent display may also be performed.

It should be noted that the foregoing embodiment provides only an exemplary manner in which the electronic device alternately displays the first information and the third information on the secondary screen at an interval of the preset duration T10. However, the manner in which the electronic device alternately displays the first information and the third information on the secondary screen at an interval of the preset duration T10 is not limited to the foregoing described embodiment, and another manner may also exist. This is not limited in this embodiment of this application.

In addition, when the second notification message and the first notification message come from a same application, the electronic device may still display the first information on the secondary screen, or the electronic device may update the first information displayed on the secondary screen. The updating the first information displayed on the secondary screen may include: when original first information is an application icon corresponding to the first notification message, updating the first information to the application icon plus a quantity of messages. In this case, the quantity of messages is 2.

502: The electronic device detects a first operation in which the user indicates to turn on the primary screen.

After the electronic device displays the first information on the secondary screen, the user may notice a prompt of the first information and want to view the mobile phone, or the user may want to use the mobile phone, so as to indicate to turn on the primary screen.

The first operation in which the user indicates to turn on the primary screen may be various user operations. For example, when the user sets the screen lock, the first operation in which the user indicates to turn on the primary screen may be fingerprint unlocking of the user, password unlocking of the user, gesture unlocking of the user, or the like. When the user does not set the screen lock, the first operation in which the user indicates to turn on the primary screen may be that the user taps the screen, the user double-taps the screen, the user presses a power button, the user slides the screen, or the like.

503: The electronic device turns on the primary screen in response to the first operation.

When detecting the first operation in which the user indicates to turn on the primary screen, the electronic device may turn on the primary screen in response to the operation.

504: The electronic device displays second information on the secondary screen.

After the electronic device displays the first information on the secondary screen, the user may want to turn on the primary screen to view the mobile phone. In this case, the secondary screen may display the second information. In addition, as shown in FIG. 2(b), because an in-screen camera 20 is disposed within a portion of the display 194, the area of the camera 20 cannot perform display. Consequently, a screen area right above the in-screen camera 20 is discontinuous when the screen is turned on. In this embodiment of this application, the secondary screen disposed right above the in-screen camera 20 displays the second information when the primary screen is turned on, so that the screen area right above the in-screen camera 20 can perform display and is not discontinuous when the screen is turned on. In addition, the second information may be specifically displayed for the user. This is novel and convenient to use.

In the solution described in steps 501 to 504, a new notification message prompt is brought to the user by using the secondary screen, so that the notification message prompt can be noticed by the user in time when the primary screen is turned off, and user experience is improved. In addition, the secondary screen can be further used to display the second information when the primary screen is turned on. This can not only resolve a problem of discontinuity of a screen area right above the in-screen camera when the screen is turned on, but also provide information display for the user. This not only improves visual experience of the user, but also is novel and convenient to use.

In this embodiment of this application, that the electronic device displays the second information on the secondary screen when the primary screen is turned on includes: If the primary screen displays a first interface, where the first interface includes the first notification message, or the first interface is an interface of an application corresponding to the first notification message, the electronic device displays first status information of the electronic device on the secondary screen. If the primary screen displays an interface other than the first interface, the second information is the first information.

The first status information is used to indicate a power status, a memory status, a network signal status, and/or a network speed status of the electronic device. The first status information may be specifically in a plurality of forms, such as a word, a digit, a character, or an icon. This is not limited in this embodiment of this application.

In some embodiments, the first status information may be specifically a first status parameter. For example, the first status parameter of the electronic device may include sub-status parameters such as a power status parameter, a memory status parameter, a network signal status parameter, and/or a network speed status parameter. However, the sub-status parameter included in the first status parameter of the electronic device is not limited thereto. This is not limited in this embodiment of this application.

That is, when the primary screen is lit up, if the primary screen displays the first interface, the first interface includes the first notification message, or the first interface is the interface of the application corresponding to the first notification message. In this case, because the user has entered the first notification message or the interface corresponding to the first notification message, the user does not need to be prompted with the first notification message. The electronic device may display the first status parameter of the electronic device on the secondary screen, so as to prompt the user with status information about the electronic device. For example, when the first notification message is the WeChat notification message, a WeChat icon is displayed on the secondary screen when the primary screen is turned off, and a WeChat interface is displayed on the primary screen after the primary screen is turned on. In this case, the secondary screen may display status parameters such as a battery level and a memory. The electronic device displays the first status parameter on the secondary screen while displaying the first interface on the primary screen, so that the screen area right above the in-screen camera is not discontinuous when the primary screen is turned on, and a status parameter can be displayed by using the secondary screen disposed right above the camera. This provides new and convenient experience for the user.

In addition, if the primary screen displays the interface other than the first interface, it indicates that the user has not viewed the first notification message or the interface corresponding to the first notification message. In this case, the second information is the first information, that is, the electronic device continues to display the first information on the secondary screen, so as to continue to indicate the user that the first notification message has been received, and prompt the user to view and process the first notification message. For example, when the first notification message is the WeChat notification message, the WeChat icon is displayed on the secondary screen when the primary screen is turned off, and after the primary screen is turned on, an interface other than the WeChat interface, for example, a phone interface, is displayed on the primary screen. In this case, the WeChat icon continues to be displayed on the secondary screen, so as to continue to indicate the user that the WeChat notification message has been received, and prompt the user to view and process the WeChat notification message.

Figure 9B:
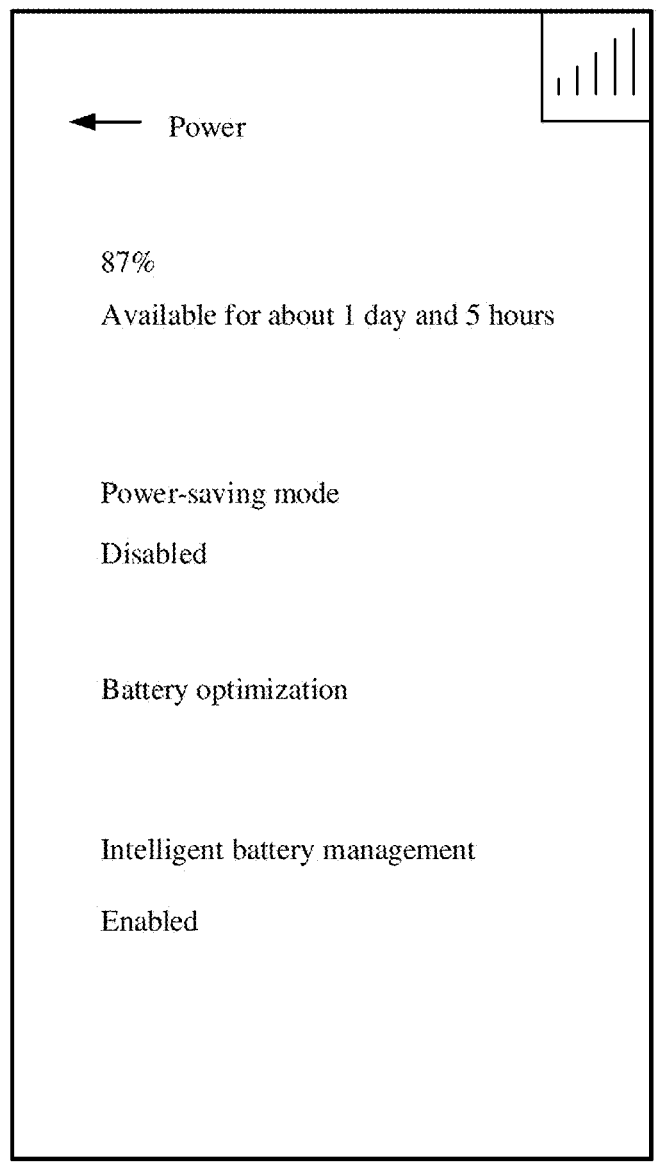
FIG. 9(b) is a schematic diagram of another status parameter notification interface according to an embodiment of this application.

The first status parameter may include a plurality of sub-status parameters, and that the electronic device displays the first status parameter of the electronic device on the secondary screen may include: When the first status parameter includes a plurality of status parameters, the electronic device displays each of the plurality of sub-status parameters in turn on the secondary screen; or if the primary screen displays an interface corresponding to a first sub-status parameter, the electronic device displays other sub-status parameters in the plurality of sub-status parameters except the first sub-status parameter in turn on the secondary screen. For example, as shown in FIG. 9(a)-1 and FIG. 9(a)-2, when the first status parameter includes the power status parameter and the network signal status parameter, the electronic device alternately displays the power status parameter and the network signal status parameter on the secondary screen. Refer to FIG. 9(b). If the primary screen displays an interface corresponding to the power status parameter, the electronic device displays the network signal status parameter on the secondary screen, and stops displaying the power status parameter.

In addition, after the electronic device displays the first status parameter of the electronic device on the secondary screen, the method further includes: The electronic device detects a second operation of modifying the first status parameter by the user on the primary screen. The electronic device displays a second status parameter obtained after modification on the secondary screen.

In other words, the user may set and modify the status parameter on the primary screen, and the secondary screen of the electronic device may display the status parameter according to the setting and modification of the user, so that display is more flexible, the user can customize a status parameter that meets the use habit of the user for display, and user experience is better.

The second operation of modifying the first status parameter by the user on the primary screen may be modifying the first status parameter by the user by using the settings menu on the primary screen, or may be modifying the first status parameter by the user by using another icon, an application menu, or a shortcut on the primary screen. A manner of the second operation of modifying the first status parameter on the primary screen is not limited in this embodiment of this application.

In addition, after the electronic device displays the first status parameter of the electronic device on the secondary screen, the method further includes: If the electronic device detects a third operation of turning off the primary screen by the user or detects no user operation within a preset duration T1, the electronic device may turn off the primary screen and the secondary screen, or the electronic device only turns off the primary screen and does not turn off the secondary screen.

After the electronic device detects that the primary screen is turned on and the electronic device displays the first status parameter of the electronic device on the secondary screen, it indicates that the user has received a prompt of the first information displayed on the secondary screen, and the user may have viewed and processed the first notification message. After the user views and processes the first notification message, the user may perform an operation such as pressing the power button, tapping the screen, or sliding the screen to turn off the primary screen. Alternatively, the user may put the mobile phone aside and wait for a period of time, and then the primary screen automatically turns off. That is, when no user operation is detected within the preset duration T1, the electronic device turns off the primary screen. In this case, because the first notification message has been processed, the secondary screen is also turned off.

The third operation of turning off the primary screen by the user is not limited to the operations such as pressing the power button, tapping the screen, or sliding the screen indicated above, and may further include other operations that can turn off the primary screen. The third operation of turning off the primary screen by the user is not limited in this embodiment of this application. In addition, the preset duration T1 is not limited in this embodiment of this application, and the user may set the preset duration T1 in the settings menu of the mobile phone. Preferably, the preset duration T1 may be duration of no-operation hibernation of the electronic device.

After the primary screen is turned off, the method further includes: If the electronic device is charging and the electronic device detects no notification message, the electronic device displays a charging parameter on the secondary screen.

After the primary screen is turned off, if the electronic device is charging and does not detect the first notification message, the electronic device may display the charging parameter on the secondary screen, so as to notify the user of a charging status.

When the primary screen is turned on, if third notification information is detected, a prompt may be performed on the secondary screen, or a prompt may be performed on the primary screen in a manner such as a pop-up window. This is not limited in this embodiment of this application.

Refer to FIG. 5. After steps 501 to 504, the method may further include the following step:

505: If the electronic device detects that the camera is started, the electronic device stops displaying the second information on the secondary screen.

After the electronic device turns on the primary screen and displays the second information on the secondary screen, the user may need to start the camera below the screen to photograph or record. In this case, the electronic device stops displaying the second information on the secondary screen, that is, information is no longer displayed on the secondary screen, so that the lens is not blocked when the user uses the camera. This does not affect proper use of the camera by the user.

The foregoing embodiment provides a new notification message prompt manner for the user. The electronic device may prompt the user with the notification message by using the secondary screen when the primary screen is turned off. The notification message prompt of the electronic device on the secondary screen can be easily noticed by the user in time, and user experience is improved. In addition, the secondary screen can be further used to display the second information when the primary screen is turned on. This can not only resolve the problem of discontinuity of the screen area right above the in-screen camera when the screen is turned on, but also provide information display for the user. This not only improves visual experience of the user, but also is novel and convenient to use.

The foregoing describes the solution of this application as an example by using an electronic device having a bezel-less screen or having a relatively large screen-to-body ratio. However, the solution of this application may also be applied to an electronic device that includes an in-screen camera and has a relatively small screen-to-body ratio. Similarly, when a primary screen is turned off, a secondary screen may be used to prompt a user with a notification message, so that the user can easily notice the notification message in time, and user experience is improved.

It may be understood that, to implement the foregoing functions, the electronic device includes a corresponding hardware and/or software module for performing each function. With reference to algorithm steps of each example described in the embodiments disclosed in this specification, this application may be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application with reference to the embodiments, but it should not be considered that the implementation goes beyond the scope of this application.

In the embodiments, the electronic device may be divided into function modules based on the foregoing method examples. For example, each function module corresponding to each function may be obtained through division, or two or more functions may be integrated into one processing module. The integrated module may be implemented in a form of hardware. It should be noted that the module division in the embodiments is an example, and is merely logical function division. In an actual implementation, another division manner may be used.

Figure 10:
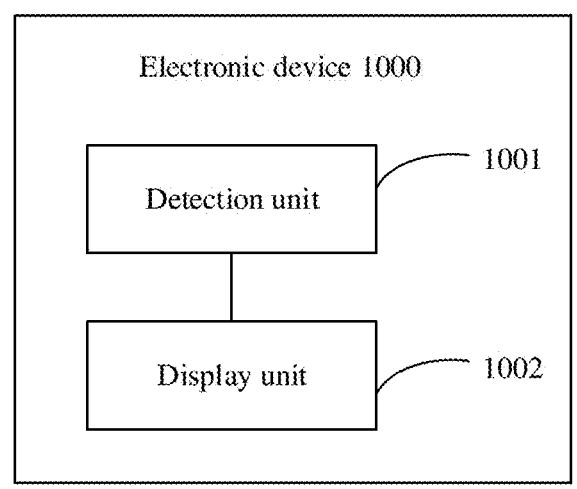
FIG. 10 is a schematic diagram of a structure of another electronic device according to an embodiment of this application.

When each function module is obtained through division corresponding to each function, FIG. 10 is a possible schematic composition diagram of an electronic device 1000 in the foregoing embodiments. As shown in FIG. 10, the electronic device 1000 may include a detection unit 1001 and a display unit 1002.

The detection unit 1001 may be configured to support the electronic device 1000 in performing step 501, step 502, and/or another process used for the technology described in this specification.

The display unit 1002 may be configured to support the electronic device 1000 in performing step 503, step 504, step 505, and/or another process used for the technology described in this specification.

It should be noted that all related content of the steps in the foregoing method embodiments may be cited in function description of corresponding function modules. Details are not described herein again.

The electronic device 1000 provided in this embodiment is configured to perform the message notification method. Therefore, an effect the same as the effect of the foregoing implementation methods can be achieved.

When an integrated unit is used, the electronic device 1000 may include a processing module, a storage module, and a communications module. The processing module may be configured to control and manage actions of the electronic device 1000, for example, may be configured to support the electronic device 1000 in performing the steps performed by the detection unit 1001 and the display unit 1002. The storage module may be configured to support the electronic device 1000 in storing program code, data, and the like. The communications module may be configured to support communication between the electronic device 1000 and another device, for example, communication with a radio access device.

The processing module may be a processor or a controller. The processing module may implement or execute various example logical blocks, modules, and circuits described with reference to content disclosed in this application. Alternatively, the processor may be a combination of processors implementing a computing function, for example, a combination of one or more microprocessors, or a combination of a digital signal processing (DSP) and a microprocessor. The storage module may be a memory. The communications module may be specifically a device that interacts with another electronic device, such as a radio frequency circuit, a Bluetooth chip, or a Wi-Fi chip.

In an embodiment, when the processing module is a processor and the storage module is a memory, the electronic device in this embodiment may be a device in the structure shown in FIG. 1.

An embodiment of this application further provides a computer storage medium. The computer storage medium stores computer instructions. When the computer instructions are run on an electronic device, the electronic device is enabled to perform the related method steps, to implement the message notification method in the foregoing embodiments.

An embodiment of this application further provides a computer program product. When the computer program product runs on a computer, the computer is enabled to perform the foregoing related steps, to implement the message notification method performed by the electronic device in the foregoing embodiments.

In addition, an embodiment of this application further provides an apparatus. The apparatus may be specifically a chip, a component, or a module. The apparatus may include a processor and a memory that are connected. The memory is configured to store computer-executable instructions, and when the apparatus runs, the processor may execute the computer-executable instructions stored in the memory, so that the chip performs the message notification method performed by the electronic device in the foregoing method embodiments.

The electronic device, the computer storage medium, the computer program product, or the chip provided in the embodiments is configured to perform a corresponding method provided above. Therefore, for beneficial effects that can be achieved by the electronic device, the computer storage medium, the computer program product, or the chip, refer to beneficial effects of the corresponding method provided above. Details are not described herein again.

The foregoing descriptions about implementations allow a person skilled in the art to understand that, for convenient and brief description, division into the foregoing function modules is used as an example for illustration. During actual application, the foregoing functions may be allocated to different function modules based on a requirement, in other words, an inner structure of an apparatus is divided into different function modules to complete all or some of the functions described above.

In the several embodiments provided in this application, it should be understood that the disclosed apparatus and method may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separate, and components displayed as units may be one or more physical units, in other words, may be located in one place, or may be distributed on a plurality of different places. Some or all of the units may be selected based on an actual requirement to achieve an objective of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in the embodiments of this application. The foregoing storage medium includes any medium that can store program code, such as a USB flash drive, a removable hard disk, a read only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A message notification method, applied to an electronic device including a camera and a screen, the screen including a primary screen and a secondary screen, wherein the camera is disposed within the screen and below the secondary screen, and the method comprises:
  when the primary screen is turned off, detecting a first notification message, by the electronic device and displaying, by the electronic device, first information on the secondary screen, wherein the first information is used to prompt a user that the first notification message has been received;
  detecting, by the electronic device, a first operation by the user indicating to turn on the primary screen;
  turning on, by the electronic device, the primary screen in response to the first operation; and
  displaying, by the electronic device, second information on the secondary screen;
  wherein after the electronic device detects the first notification message, the method further comprises
  detecting, by the electronic device, a second notification message, wherein the second notification message and the first notification message are from different applications, wherein
  displaying, by the electronic device, the first information on the secondary screen comprises displaying, by the electronic device, the first information and third information on the secondary screen, wherein the third information is used to prompt the user that the second notification message has been received, and
  displaying, by the electronic device, the first information and third information on the secondary screen comprises turning on, by the electronic device, the secondary screen to notify the user, or intermittently turning on, by the electronic device, the secondary screen on the secondary screen to notify the user, or dynamically displaying, by the electronic device, a first interface element on the secondary screen; and
  displaying, by the electronic device, the first information and the third information on the secondary screen after the electronic device detects the operation of the user picking up the electronic device.

2. The method according to claim 1, wherein the first information comprises an application icon or an application name corresponding to the first notification message.

3. The method according to claim 1, wherein displaying, by the electronic device, the second information on the secondary screen comprises:
displaying, by the electronic device, a first status parameter of the electronic device on the secondary screen when the primary screen displays a first interface comprising the first notification message.

4. The method according to claim 1, wherein displaying, by the electronic device, the second information on the secondary screen comprises:
displaying, by the electronic device, a first status parameter of the electronic device on the secondary screen when an interface of an application corresponds to the first notification message.

5. The method according to claim 1, wherein,
when the primary screen displays an interface other than the first interface, the second information is the first information.

6. The method according to claim 3, wherein the first status parameter of the electronic device comprises at least one of the following sub-status parameters: a power status parameter, a memory status parameter, a network signal status parameter, or a network speed status parameter.

7. The method according to claim 3, wherein the first status parameter comprises a plurality of sub-status parameters, and displaying, by the electronic device, the first status parameter of the electronic device on the secondary screen comprises:
displaying, by the electronic device, each of the plurality of sub-status parameters in turn on the secondary screen.

8. The method according to claim 3, wherein the first status parameter comprises a plurality of sub-status parameters, and displaying, by the electronic device, the first status parameter of the electronic device on the secondary screen comprises:
displaying, by the electronic device, other sub-status parameters in the plurality of sub- status parameters except the first sub-status parameter in turn on the secondary screen, when the primary screen displays an interface corresponding to a first sub-status parameter.

9. The method according to claim 3, wherein after displaying, by the electronic device, the first status parameter of the electronic device on the secondary screen, the method further comprises:
detecting, by the electronic device, a second operation of the user modifying the first status parameter on the primary screen; and
displaying, by the electronic device, a second status parameter that is obtained after the modification on the primary screen, on the secondary screen.

10. The method according to claim 3, wherein after displaying, by the electronic device, the first status parameter of the electronic device on the secondary screen, the method further comprises:
turning off, by the electronic device, the primary screen and the secondary screen when the electronic device detects a third operation of the user turning off the primary screen or detects no user operation within a preset duration T1.

11. The method according to claim 1, wherein after displaying, by the electronic device, the second information on the secondary screen, the method further comprises:
stopping displaying, by the electronic device, the second information on the secondary screen when the electronic device detects that the camera is started.

12. The method according to claim 1, wherein after the primary screen is turned off, the method further comprises:
displaying, by the electronic device, a charging parameter on the secondary screen when the electronic device is charging and the electronic device detects no notification message.

13. A message notification method applied to an electronic device including a camera and a screen, the screen including a primary screen and a secondary screen, wherein the camera is disposed within the screen and below the secondary screen, and the method comprises:
when the primary screen is turned off, detecting a first notification message, by the electronic device and displaying, by the electronic device, first information on the secondary screen, wherein the first information is used to prompt a user that the first notification message has been received;
detecting, by the electronic device, a first operation by the user indicating to turn on the primary screen;
turning on, by the electronic device, the primary screen in response to the first operation; and
displaying, by the electronic device, second information on the secondary screen;
wherein after the electronic device detects the first notification message, the method further comprises
detecting, by the electronic device, a second notification message, wherein the second notification message and the first notification message are from different applications, wherein
displaying, by the electronic device, the first information on the secondary screen comprises displaying, by the electronic device, the first information and third information on the secondary screen, wherein the third information is used to prompt the user that the second notification message has been received; and
wherein displaying, by the electronic device, the first information and third information on the secondary screen comprises alternately displaying, by the electronic device, the first information and the third information on the secondary screen at an interval of a preset duration T2.

14. An electronic device, comprising:
a screen comprising a primary screen and a secondary screen;
a camera disposed within the screen and below the secondary screen;
one or more processors;
a memory;
a plurality of applications; and
one or more computer programs stored in the memory, the one or more computer programs comprising instructions, and when the instructions are executed by the one or more processors, the electronic device is enabled to perform the following steps:
after the primary screen is turned off, when a first notification message is detected, displaying first information on the secondary screen, wherein the first information is used to prompt a user that the first notification message has been received;

detecting a first operation in which the user indicates to turn on the primary screen;
turning on the primary screen in response to the first operation; and
displaying second information on the secondary screen;
wherein after the electronic device detects the first notification message, the method further comprises
detecting, by the electronic device, a second notification message, wherein the second notification message and the first notification message are from different applications, wherein
displaying, by the electronic device, the first information on the secondary screen comprises displaying, by the electronic device, the first information and third information on the secondary screen, wherein the third information is used to prompt the user that the second notification message has been received, and
displaying, by the electronic device, the first information and third information on the secondary screen comprises turning on, by the electronic device, the secondary screen to notify the user, or intermittently turning on, by the electronic device, the secondary screen on the secondary screen to notify the user, or dynamically displaying, by the electronic device, a first interface element on the secondary screen; and
displaying, by the electronic device, the first information and the third information on the secondary screen after the electronic device detects the operation of the user picking up the electronic device.

15. An electronic device, comprising:
a screen comprising a primary screen and a secondary screen;
a camera disposed within the screen and below the secondary screen;
one or more processors;
a memory;
a plurality of applications; and
one or more computer programs stored in the memory, the one or more computer programs comprising instructions, and when the instructions are executed by the one or more processors, the electronic device is enabled to perform the following steps:
when the primary screen is turned off, detecting a first notification message, by the electronic device and displaying, by the electronic device, first information on the secondary screen, wherein the first information is used to prompt a user that the first notification message has been received;
detecting, by the electronic device, a first operation by the user indicating to turn on the primary screen;
turning on, by the electronic device, the primary screen in response to the first operation; and
displaying, by the electronic device, second information on the secondary screen;
wherein after the electronic device detects the first notification message, the method further comprises
detecting, by the electronic device, a second notification message, wherein the second notification message and the first notification message are from different applications, wherein
displaying, by the electronic device, the first information on the secondary screen comprises displaying, by the electronic device, the first information and third information on the secondary screen, wherein the third information is used to prompt the user that the second notification message has been received; and
wherein displaying, by the electronic device, the first information and third information on the secondary screen comprises alternately displaying, by the electronic device, the first information and the third information on the secondary screen at an interval of a preset duration T2.

* * * * *

UNITED STATES PATENT AND TRADEMARK OFFICE
CERTIFICATE OF CORRECTION

| | | |
|---|---|---|
| PATENT NO. | : 12,095,941 B2 | Page 1 of 1 |
| APPLICATION NO. | : 17/674992 | |
| DATED | : September 17, 2024 | |
| INVENTOR(S) | : Shikun Xu et al. | |

It is certified that error appears in the above-identified patent and that said Letters Patent is hereby corrected as shown below:

In the Claims

In Column 34, Line 14, in Claim 13, delete "method" and insert -- method, --.

Signed and Sealed this
Third Day of December, 2024

Katherine Kelly Vidal
*Director of the United States Patent and Trademark Office*